(12) United States Patent
Stokes et al.

(10) Patent No.: US 12,040,456 B2
(45) Date of Patent: *Jul. 16, 2024

(54) MEMBRANES, CALENDERED MICROPOROUS MEMBRANES, BATTERY SEPARATORS, AND RELATED METHODS

(71) Applicant: Celgard, LLC, Charlotte, NC (US)

(72) Inventors: Kristoffer K. Stokes, Lunenburg, MA (US); William John Mason, McConnells, SC (US); Kang Karen Xiao, Mississauga (CA); Xiaomin Zhang, Charlotte, NC (US); Barry J. Summey, Lake Wylie, SC (US); Robert Moran, Concord, NC (US); Jeffrey Gordon Poley, Indian Land, SC (US); Brian R. Stepp, Scottsdale, AZ (US); Changqing Wang Adams, Fort Mill, SC (US); Daniel R. Alexander, Matthews, NC (US); Shante P. Williams, Charlotte, NC (US); Andrew Edward Voss, Rock Hill, SC (US); Douglas George Robertson, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,094

(22) Filed: Jan. 27, 2023

(65) Prior Publication Data
US 2023/0238587 A1     Jul. 27, 2023

Related U.S. Application Data

(62) Division of application No. 17/020,347, filed on Sep. 14, 2020, now Pat. No. 11,569,549, which is a
(Continued)

(51) Int. Cl.
*H01M 10/42*     (2006.01)
*B29C 48/00*     (2019.01)
(Continued)

(52) U.S. Cl.
CPC ..... *H01M 10/4235* (2013.01); *H01M 50/403* (2021.01); *H01M 50/411* (2021.01);
(Continued)

(58) Field of Classification Search
CPC . B32B 27/08; B32B 27/32; B32B 2038/0028; B32B 2457/10;
(Continued)

(56) References Cited

U.S. PATENT DOCUMENTS 5,547,756 A     8/1996   Kamo et al.
5,691,077 A    11/1997   Yu
(Continued)

FOREIGN PATENT DOCUMENTS

WO   WO002006062739    6/2006

*Primary Examiner* — Philip C Tucker
*Assistant Examiner* — Brian R Slawski
(74) *Attorney, Agent, or Firm* — Hammer & Associates, P.C.

(57) ABSTRACT

Novel or improved microporous single or multilayer battery separator membranes, separators, batteries including such membranes or separators, methods of making such membranes, separators, and/or batteries, and/or methods of using such membranes, separators and/or batteries are provided. In accordance with at least certain embodiments, a multilayer dry process polyethylene/polypropylene/polyethylene microporous separator which is manufactured using the inventive process which includes machine direction stretching followed by transverse direction stretching and a subsequent calendering step as a means to reduce the thickness of the multilayer microporous membrane, to reduce the percent porosity of the multilayer microporous membrane in
(Continued)

a controlled manner and/or to improve transverse direction tensile strength. In a very particular embodiment, the inventive process produces a thin multilayer microporous membrane that is easily coated with polymeric-ceramic coatings, has excellent mechanical strength properties due to its polypropylene layer or layers and a thermal shutdown function due to its polyethylene layer or layers. The ratio of the thickness of the polypropylene and polyethylene layers in the inventive multilayer microporous membrane can be tailored to balance mechanical strength and thermal shutdown properties.

4 Claims, 20 Drawing Sheets

Related U.S. Application Data division of application No. 15/267,566, filed on Sep. 16, 2016, now Pat. No. 10,777,800.

(60) Provisional application No. 62/220,517, filed on Sep. 18, 2015.

(51) Int. Cl.
*B29C 48/21* (2019.01)
*B29C 65/02* (2006.01)
*B32B 27/08* (2006.01)
*B32B 27/32* (2006.01)
*B32B 37/16* (2006.01)
*B32B 38/00* (2006.01)
*H01M 10/052* (2010.01)
*H01M 50/403* (2021.01)
*H01M 50/411* (2021.01)
*H01M 50/417* (2021.01)
*H01M 50/431* (2021.01)
*H01M 50/434* (2021.01)
*H01M 50/44* (2021.01)
*H01M 50/446* (2021.01)
*H01M 50/449* (2021.01)
*H01M 50/451* (2021.01)
*H01M 50/457* (2021.01)
*H01M 50/463* (2021.01)
*B29C 48/08* (2019.01)
*B29C 55/00* (2006.01)
*B29C 55/02* (2006.01)
*B29C 55/14* (2006.01)
*B29C 65/00* (2006.01)
*B32B 37/14* (2006.01)
*H01M 50/489* (2021.01)
*H01M 50/491* (2021.01)
*H01M 50/494* (2021.01)

(52) U.S. Cl.
CPC ....... *H01M 50/417* (2021.01); *H01M 50/431* (2021.01); *H01M 50/434* (2021.01); *H01M 50/44* (2021.01); *H01M 50/446* (2021.01); *H01M 50/449* (2021.01); *H01M 50/451* (2021.01); *H01M 50/457* (2021.01); *H01M 50/463* (2021.01); *B29C 48/022* (2019.02); *B29C 48/08* (2019.02); *B29C 48/21* (2019.02); *B29C 55/005* (2013.01); *B29C 55/023* (2013.01); *B29C 55/143* (2013.01); *B29C 65/02* (2013.01); *B29C 66/45* (2013.01); *B29C 66/723* (2013.01); *B29C 66/727* (2013.01); *B32B 27/08* (2013.01); *B32B 27/32* (2013.01); *B32B 37/144* (2013.01); *B32B 37/16* (2013.01); *B32B 2038/0028* (2013.01); *B32B 2250/03* (2013.01); *B32B 2307/518* (2013.01); *B32B 2457/10* (2013.01); *H01M 10/052* (2013.01); *H01M 50/489* (2021.01); *H01M 50/491* (2021.01); *H01M 50/494* (2021.01); *H01M 2220/20* (2013.01); *Y02E 60/10* (2013.01); *Y02P 70/50* (2015.11)

(58) Field of Classification Search
CPC ............ B32B 38/0032; B32B 2250/03; B32B 2305/026; B32B 9307/518; B32B 37/16; B32B 37/144; B29C 47/0021; B29C 47/0057; B29C 47/065; B29C 65/02; B29C 65/18; B29C 66/727; B29C 66/723; B29C 66/45; B29C 48/022; B29C 48/08; B29C 48/21; B29C 55/00; B29C 55/005; B29C 55/02; B29C 55/023; B29C 55/10; B29C 55/12; B29C 55/14; B29C 55/143; H01M 2/145; H01M 2/16; H01M 2/166; H01M 2/1653; H01M 2/1686; H01M 2/1606; H01M 2/162; Y02E 60/10; Y02P 70/50
USPC .... 156/60, 77, 78, 79, 90, 229, 242, 244.11, 156/244.24, 244.27, 246, 308.2, 309.6, 156/324; 429/129, 142, 144, 145, 247, 429/249, 254; 264/41; 428/315.9, 316.6
See application file for complete search history.

(56) References Cited

U.S. PATENT DOCUMENTS

| | | | |
|---|---|---|---|
| 6,432,586 B1 | 8/2002 | Zhang | |
| 6,602,593 B1* | 8/2003 | Callahan | H01M 50/451 428/315.9 |
| 8,460,829 B1 | 6/2013 | Huang et al. | |
| 8,486,556 B2 | 7/2013 | Call et al. | |
| 2002/0187400 A1* | 12/2002 | Matsumoto | H01M 10/30 429/174 |
| 2007/0148538 A1* | 6/2007 | Call | H01M 50/457 156/77 |
| 2008/0118827 A1 | 5/2008 | Call et al. | |
| 2009/0098449 A1 | 4/2009 | Funakoa et al. | |
| 2009/0253032 A1 | 10/2009 | Takita et al. | |
| 2010/0209745 A1 | 8/2010 | Kimishima | |
| 2012/0141859 A1* | 6/2012 | Murata | H01M 50/446 428/319.3 |
| 2012/0177976 A1* | 7/2012 | Wensley | H01M 50/457 429/247 |
| 2014/0045033 A1 | 2/2014 | Zhang et al. | |
| 2014/0079980 A1 | 3/2014 | Halmo et al. | |

* cited by examiner (A) (B)

(A)

(B)

| Layer thickness=10.9 | Layer thickness=3.54 | Layer thickness=1.18 |
| Path through=14.26 | Path through=7.8 | Path through=9 |
| T=1.31 | T=1.4 | T=7.6 |
| (A) | (B) | (C) |

(Reference)

LAMELLA
INTERLAMELLAR REGION
BRIDGING STRUCTURE
MICROPORES (white bar is 1um)

MEMBRANES, CALENDERED MICROPOROUS MEMBRANES, BATTERY SEPARATORS, AND RELATED METHODS

CROSS REFERENCE TO RELATED APPLICATIONS

This application is a Divisional Application of U.S. application Ser. No. 17/020,347, filed Sep. 14, 2020 and issued as U.S. Pat. No. 11,569,549, which claims priority to U.S. application Ser. No. 15/267,566, filed Sep. 16, 2016, and issued as U.S. Pat. No. 10,777,800, on Sep. 15, 2020, which claims priority to and the benefit of U.S. Provisional Patent application Ser. No. 62/220,517 filed Sep. 18, 2015, hereby fully incorporated by reference herein.

FIELD OF THE INVENTION

The present application or invention is directed to novel, improved or modified membranes, multilayer membranes, separator membranes, calendered membranes, stretched membranes, stretched and calendered membranes, stretched and calendered dry process membranes, separator membranes, coated membranes, membranes with unique structures, membranes with enhanced performance, membrane separators, battery separators, shutdown separators, and/or batteries or cells including such membranes or separators, and/or methods of making such membranes, separators, cells, and/or batteries, and/or methods of using such membranes, separators, cells, and/or batteries. In accordance with at least selected embodiments, the present application or invention is directed to novel or improved stretched membranes, calendered membranes, stretched and calendered membranes, biaxially stretched membranes, sequentially biaxially stretched membranes, simultaneously biaxially stretched membranes, biaxially stretched and calendered membranes, porous membranes, stretched and calendered dry process membranes, dry process separator membranes, coated dry process membranes, membranes with unique structures, membranes with enhanced performance, single or multilayer membranes, microporous membranes, microporous multilayer membranes, thin calendered membranes, thin and strong calendered membranes, thin, strong and/or high performance calendered membranes, dry process membranes, thin dry process membranes, thin calendered dry process membranes, thin and strong calendered dry process membranes, thin, strong and/or high performance calendered dry process membranes, thin, strong and/or high performance calendered dry process membranes with unique structures and/or characteristics, thin, strong and/or high performance calendered and coated dry process membranes, thin, strong and/or high performance stretched and calendered dry process membranes, thin, strong and/or high performance stretched, calendered and coated dry process membranes, battery separator membranes, battery separators, and/or batteries or cells including such membranes or separators, such stretched, calendered and/or coated membranes or separators, such biaxially stretched and/or calendered membranes or separators, such biaxially stretched and/or coated membranes or separators, or such biaxially stretched, calendered, and/or coated membranes or separators, and/or methods of making such membranes, separators, cells, and/or batteries, and/or methods of using such membranes, separators, cells and/or batteries. In accordance with at least certain embodiments, the present application or invention is directed to novel or improved calendered, single or multilayer membranes, trilayer membranes, inverted trilayer membranes, porous membranes, porous multilayer membranes, trilayer dry process membranes, inverted trilayer dry process membranes, battery separator membranes, battery separators, and/or batteries or cells including such membranes or separators, and/or methods of making such membranes, separators, cells, and/or batteries, and/or methods of using such membranes, separators, cells and/or batteries. In accordance with at least certain selected embodiments, the present application or invention is directed to novel or improved monolayer or multilayer porous membranes or separators. In accordance with at least certain particular selected embodiments, the present application or invention is directed to novel or improved monolayer, multilayer, trilayer, inverted trilayer, porous membranes, porous multilayer membranes, battery separator membranes, and/or battery separators such as a multilayer dry process membrane or separator, a dry process polyolefin membrane or separator, a dry process polyolefin multilayer membrane or separator, and/or a polyethylene/polypropylene/polyethylene microporous membrane or separator which is manufactured using an exemplary inventive process described herein which includes stretching and a subsequent calendering step such as a machine direction stretching followed by transverse direction stretching (with or without machine direction relax) and a subsequent calendering step as a possibly preferred means to reduce the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator. The inventive process may produce 10 μm or less single or multilayer microporous membranes. The inventive process may produce a 10 μm or less multilayer microporous membrane that is easily coated with polymeric-ceramic coatings, has excellent mechanical strength properties due to its inner polypropylene layer, and/or a thermal shutdown function due to the outer polyethylene layers. The ratio of the thickness of the polypropylene and polyethylene layers in such an inventive multilayer microporous membrane can be tailored to select, optimize, and/or balance strength, properties, and/or performance thereof, such as mechanical strength and thermal shutdown properties.

BACKGROUND OF THE INVENTION

A commonly known multilayer polyolefin separator which may be used in a lithium ion rechargeable battery is a dry process, uniaxially stretched, polyolefin trilayer (or tri-layer) separator produced by Celgard, LLC of Charlotte, North Carolina, and includes three layers of a polyolefin separator membrane or film configured as polypropylene/polyethylene/polypropylene (PP/PE/PP trilayer), where an inner polyethylene (PE) microporous membrane is sandwiched between two outer layers of polypropylene (PP) microporous membrane. The inner PE layer in a the multilayer microporous separator may function as a thermal shutdown layer in the event of a thermal run away event. The use of polypropylene as the outer layers in such a trilayer battery separator structure may provide a higher mechanical and thermal strength. In some instances, use of polypropylene as the outer layers in a trilayer battery separator may be a preferred configuration. U.S. Patent Publication No. 2007/0148538 proposes a multilayer configuration of 'polypropylene/polyethylene/polypropylene' (PP/PE/PP) as a microporous trilayer separator where polypropylene may be used as the outer or exterior layers or films due to its higher tensile strength and higher melt temperature and polyethylene may be used as the inner polyethylene layer or film due to its lower melt temperature and thermal shutdown function. U.S. Pat. Nos. 5,952,120, 5,691,077, and 8,486,556 and U.S. Patent Publication Nos. 2014/079980, and 2008/118827 disclose various methods for making dry process multilayer microporous separators where PP may be used as the outer layers and PE may be used as the inner shutdown layer in a trilayer PP/PE/PP microporous separator for a lithium ion rechargeable battery.

FIG. 1 presents a schematic for a known method of manufacturing a trilayer PP/PE/PP microporous separator as described in US Patent Publication No. 2007/0148538. After extrusion, nonporous PP and PE layers or films are stacked in a trilayer configuration and laminated using heat and pressure to form a nonporous PP/PE/PP trilayer precursor. Subsequent steps of annealing and machine direction stretching of the nonporous PP/PE/PP trilayer precursor produce a uniaxial stretched PP/PE/PP trilayer microporous separator. The lamination step may be described as a bonding step which may be performed with heat and pressure using nip rollers. Lamination and/or bonding may commonly be used to join two polymer materials together with heat and pressure.

The thickness of a multilayer microporous separator plays an important role in the design of a lithium ion battery. A microporous separator membrane or separator which has a thickness less than 10 µm may be desirable because it may take up less space inside a battery and may allow for more electrode active material to be packed in a battery cell to produce a higher energy density and higher rate capability battery.

Furthermore, thinner microporous membranes may provide a preferred microporous substrate for polymeric-ceramic based coatings. U.S. Patent Publication No. 2014/0045033 discloses aqueous polymeric-ceramic based coatings that range from 4-7 µm in thickness which may be coated onto a 12-18 µm thick PP/PE/PP microporous membrane. The total thickness of the coated PP/PE/PP membrane may range from 16 to 25 um.

For at least certain battery applications or technologies, there is still a need for thinner, stronger, more uniform, better performing membranes, dry process membranes, separator membranes, coated membranes, membranes with unique structures, membranes with enhanced performance, membrane separators, battery separators, shutdown separators, and/or batteries or cells including such membranes or separators, and/or methods of making such membranes, separators, cells, and/or batteries, and/or methods of using such membranes, separators, cells, and/or batteries. There is a need for a multilayer shutdown microporous membrane that has a thickness less than 10 µm for use as a battery separator and/or as a microporous substrate for polymeric-ceramic based coatings to form a coated battery separator. In addition, there is a need for a multilayer shutdown microporous membrane with a thickness less than 10 µm which may be easily coated with a polymeric-ceramic based coating where the coating has excellent adhesion to the membrane and excellent adhesion to an electrode. Furthermore, there is a need for a multilayer shutdown microporous membrane with a thickness less than 10 µm which may be coated with a polymeric-ceramic based coating where the coating thickness may be less than 7 µm. Furthermore, there is a need for a multilayer shutdown microporous membrane with a thickness less than 10 µm which has excellent machine direction (MD) and transverse direction (TD) tensile strength and that can be easily coated with a polymeric-ceramic coating.

SUMMARY OF THE INVENTION

At least certain embodiments, aspects, or objects of the present application or invention may address the above needs, and/or may provide novel, improved or modified membranes, multilayer membranes, separator membranes, calendered membranes, stretched membranes, stretched and calendered membranes, stretched and calendered dry process membranes, separator membranes, coated membranes, membranes with unique structures, membranes with enhanced performance, membrane separators, battery separators, shutdown separators, and/or batteries or cells including such membranes or separators, and/or methods of making such membranes, separators, cells, and/or batteries, and/or methods of using such membranes, separators, cells, and/or batteries. In accordance with at least selected embodiments, the present application or invention is directed to novel or improved stretched membranes, calendered membranes, stretched and calendered membranes, biaxially stretched membranes, sequentially biaxially stretched membranes, simultaneously biaxially stretched membranes, biaxially stretched and calendered membranes, porous membranes, stretched and calendered dry process membranes, dry process separator membranes, coated dry process membranes, membranes with unique structures, membranes with enhanced performance, single or multilayer membranes, microporous membranes, microporous multilayer membranes, thin calendered membranes, thin and strong calendered membranes, thin, strong and/or high performance calendered membranes, dry process membranes, thin dry process membranes, thin calendered dry process membranes, thin and strong calendered dry process membranes, thin, strong and/or high performance calendered dry process membranes, thin, strong and/or high performance calendered dry process membranes with unique structures and/or characteristics, thin, strong and/or high performance calendered and coated dry process membranes, thin, strong and/or high performance stretched and calendered dry process membranes, thin, strong and/or high performance stretched, calendered and coated dry process membranes, battery separator membranes, battery separators, and/or batteries or cells including such membranes or separators, such stretched, calendered and/or coated membranes or separators, such biaxially stretched and/or calendered membranes or separators, such biaxially stretched and/or coated membranes or separators, or such biaxially stretched, calendered, and/or coated membranes or separators, and/or methods of making such membranes, separators, cells, and/or batteries, and/or methods of using such membranes, separators, cells and/or batteries. In accordance with at least certain embodiments, the present application or invention is directed to novel or improved calendered, single or multilayer membranes, trilayer membranes, inverted trilayer membranes, porous membranes, porous multilayer membranes, trilayer dry process membranes, inverted trilayer dry process membranes, battery separator membranes, battery separators, and/or batteries or cells including such membranes or separators, and/or methods of making such membranes, separators, cells, and/or batteries, and/or methods of using such membranes, separators, cells and/or batteries. In accordance with at least certain selected embodiments, the present application or invention is directed to novel or improved monolayer or multilayer porous membranes or separators. In accordance with at least certain particular selected embodiments, the present application or invention is directed to novel or improved monolayer, multilayer, trilayer, inverted trilayer, porous membranes, porous multilayer membranes, battery separator membranes, and/or battery separators such as a multilayer dry process membrane or separator, a dry process polyolefin membrane or separator, a dry process polyolefin multilayer membrane or separator, and/or a polyethylene/polypropylene/polyethylene microporous membrane or separator which is manufactured using an exemplary inventive process described herein which includes stretching and a subsequent calendering step such as a machine direction stretching followed by transverse direction stretching (with or without machine direction relax) and a subsequent calendering step as a possibly preferred means to reduce the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator. The inventive process may produce 10 µm or less single or multilayer microporous membranes. The inventive process may produce a 10 µm or less multilayer microporous membrane that is easily coated with polymeric-ceramic coatings, has excellent mechanical strength properties due to its inner polypropylene layer, and/or a thermal shutdown function due to the outer polyethylene layers. The ratio of the thickness of the polypropylene and polyethylene layers in such an inventive multilayer microporous membrane can be tailored to select, optimize, and/or balance strength, properties, and/or performance thereof, such as mechanical strength and thermal shutdown properties.

At least certain embodiments, aspects, or objects of the present application may address the above separator needs, and/or may provide novel, improved or modified multilayer membranes, separator membranes, battery separators, batteries or cells including such membranes or separators, methods of making such membranes, separators, cells, and/or batteries, and/or methods of using such membranes, separators, cells, and/or batteries. In accordance with at least selected embodiments, the present application or invention is directed to novel or improved calendered, porous or microporous multilayer membranes, battery separator membranes, battery separators, batteries or cells including such membranes or separators, methods of making such membranes, separators, cells, and/or batteries, and/or methods of using such membranes, separators, cells and/or batteries. In accordance with at least certain embodiments, the present application or invention is directed to novel or improved calendered, inverted trilayer, microporous multilayer membranes, battery separator membranes, battery separators, batteries or cells including such membranes or separators, methods of making such membranes, separators, cells, and/or batteries, and/or methods of using such membranes, separators, cells and/or batteries. In accordance with at least certain selected embodiments, the present application or invention is directed to novel or improved inverted trilayer, microporous multilayer membranes, battery separator membranes, or battery separators made of a multilayer dry process polyethylene/polypropylene/polyethylene microporous membrane or separator which is manufactured using the inventive process described herein which includes machine direction stretching followed by transverse direction stretching and a subsequent calendering step as a means to reduce thickness of such a multilayer microporous membrane, reduce the percent porosity of a multilayer microporous membrane in a controlled manner, and/or improve transverse direction tensile strength. The inventive process may produce a 10 µm or less multilayer microporous membrane that is easily coated with polymeric-ceramic coatings, has excellent mechanical strength properties due to its inner polypropylene layer, and/or a thermal shutdown function due to the outer polyethylene layers. The ratio of the thickness of the polypropylene and polyethylene layers in such an inventive multilayer microporous membrane can be tailored to balance mechanical strength and thermal shutdown properties.

In accordance with at least selected embodiments, the present application or invention may be directed to an improved microporous battery separator membrane, membrane separator, or separator for a lithium rechargeable battery, such as a lithium ion battery, polymer battery, pouch cell, cylindrical cell, prismatic cell, large format cell, pack, module, system, or the like, and various methods of making and/or using such separators or membranes and batteries. The battery separator described herein may be a multilayer polyolefin membrane (or film) comprising polypropylene and polyethylene. The polypropylene (PP) may be a polypropylene or a blend or a co-polymer of two or more propylenes or polypropylenes and the polyethylene (PE) may be a polyethylene or a blend or a co-polymer of two or more ethylenes or polyethylenes.

A possibly preferred inventive novel, improved or modified multilayer polyolefin separator membrane for use in a lithium ion rechargeable battery may include three layers of a polyolefin separator membrane configured as polypropylene/polyethylene/polypropylene (PP/PE/PP), where an inner polyethylene (PE) microporous membrane is sandwiched between two outer layers of polypropylene (PP) microporous membrane, and wherein one or more layers thereof are stretched, calendered, and optionally coated. A multilayer polyolefin microporous membrane including polypropylene (PP) and polyethylene (PE) may be desirable because it has a thermal shutdown function and may prevent a thermal run away event in a battery. One example of a known polypropylene (PP) and polyethylene (PE) containing dry process membrane is a uniaxially stretched (MD only) laminated PP/PE/PP trilayer microporous membrane separator which is manufactured as shown in FIG. 1. The initial step in the manufacturing a PP/PE/PP trilayer microporous membrane is extrusion of a non-porous PE membrane and extrusion of a non-porous PP membrane. The nonporous PE and PE membrane are stacked in a PP/PE/PP trilayer configuration and laminated using heat and pressure to form a nonporous PP/PE/PP trilayer precursor membrane. Subsequent steps of annealing and machine direction stretching of the nonporous PP/PE/PP trilayer precursor membrane produces a uniaxial, machine direction stretched PP/PE/PP trilayer microporous membrane. This uniaxial, machine direction stretched PP/PE/PP trilayer microporous membrane may be used as a precursor that is TD stretched (preferably with MD relax) or biaxially stretched and then calendered.

Another process to manufacture a multilayer PP/PE/PP separator membrane may include biaxial stretching of the annealed nonporous membrane using machine direction stretching followed by transverse direction stretching (preferably with MD relax). The transverse directional stretching is commonly referred to as TD stretching. TD stretching may improve transverse direction tensile strength and may reduce splittiness of a microporous polyolefin membrane. This biaxial stretched PP/PE/PP trilayer microporous membrane may be used as a stretched precursor that is calendered and optionally coated.

FIG. 2 presents another process to manufacture a multilayer PP/PE/PP dry process separator membrane which may include TD stretching of the MD stretched membrane followed by a calendering step to reduce the thickness of the overall PP/PE/PP microporous membrane. Calendering may be cold, ambient (room temperature), or hot and may include the application of pressure or the application of heat and pressure to reduce the thickness of a membrane or film in a controlled manner. In addition, the calendering process may use heat, pressure and speed to densify a heat sensitive material. In addition, the calendering process may use uniform or non-uniform heat, pressure and/or speed to selectively densify a heat sensitive material, to provide a uniform or non-uniform calender condition (such as by use of a smooth roll, rough roll, patterned roll, micro pattern roll, nano pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like.

While the typical multilayer microporous PP/PE/PP membrane separator has enjoyed great commercial success as a separator in a lithium ion rechargeable battery, for at least certain battery technologies, such as for mobile and electric vehicle applications there is a need for coating the microporous PP/PE/PP membrane separator with a polymeric-ceramic containing coating in order to further improve the thermal safety of a battery. Due to the relatively low surface tension of polypropylene (30 to 32 dyne-cm) as compared to polyethylene (34 to 36 dyne-cm), polyethylene may be easier to coat than PP when the coating is a polymeric-ceramic coating. The present invention may address this issue and improve coating adhesion by TD stretching and calendering the membrane, by biaxial stretching and calendering the membrane, by placing PE on the outer surface of the membrane (such as PE/PP/PE), and/or by adding PE to the outer surface of the membrane or separator (such as PE/PP/PE/PP or PE/PP/PE/PP/PE). Using or adding PE on the outer surface can also reduce the pin removal force compared to that of certain PP outer layers.

When a thinner microporous membrane substrate with a thickness of 10 μm is coated with a 4-7 μm polymeric-ceramic based coating, the total maximum thickness may be between 14 and 17 μm. A 10 μm microporous membrane that is coated with a 7 μm polymeric-ceramic based coating, may have a total thickness of 17 m. A porous or microporous membrane that is less than 10 μm and coated with a 4 μm polymeric-ceramic based coating, may have a total thickness less than 14 μm, more preferably less than or equal to 12 μm, and most preferably less than 10 μm. The possibly preferred porous or microporous membrane substrate (or base film) to be coated may be sequentially or simultaneously biaxially stretched and then calendered to be less than 20 um thick, preferably less than 15 um thick, more preferably 10 um or less thick, and most preferably 5 um or less thick. Also, the coating may be applied on one or both sides of the membrane.

In accordance with at least selected embodiments calendering may improve membrane strength, wettability, and/or uniformity and reduce surface layer defects that have become incorporated during the manufacturing process. The more uniform membrane may improve coatability. Furthermore, utilizing a textured calendering roll may aid in improved coating to base membrane adhesion.

In accordance with at least selected embodiments, the present application is directed to a novel or improved microporous multilayer dry process battery separator membrane, separators, batteries including such separators, methods of making such membranes, separators, and/or batteries, and/or methods of using such membranes, separators and/or batteries where polyethylene, a blend of different polyethylenes or a mixture of polyethylene and polypropylene are used as outer layers of a multilayer microporous membrane and polypropylene may be used as an inner layer(s). In accordance with at least certain embodiments, the present invention is directed to a multilayer polyolefin microporous membrane where polyethylene, a blend of different polyethylenes or a mixture of polyethylene and polypropylene are used in one or more outer layers of a multilayer microporous membrane and polypropylene may be used as one or more inner layers where the lay-up configuration maybe, but is not limited to, PE/PP/PE.

In accordance with at least selected embodiments, the present application is directed to, but is not limited to, a PE/PP/PE dry microporous membrane which is manufactured using a combination of machine direction stretch, transverse direction stretch, and calendering steps as shown in FIG. 3. The order of these three steps (MD/TD/C) may be important in the overall separator and battery performance properties of the PE/PP/PE microporous membrane. MD stretching may provide rectangular slit-shaped micropores, whereas the TD stretching may alter the amount of crystallinity and the amorphous content of membrane resulting in an improvement in TD tensile strength, reduced splittiness and higher percent porosity. Combining MD and TD stretch with a subsequent calendering step may produce an overall thinner PE/PP/PE microporous membrane. TD stretching may involve an increase in percent porosity in the microporous membrane. A calendering step following TD stretching may provide as means to modify the increase in percent porosity which may occur during TD stretching, and lower the overall percent porosity of the MD/TD/Calendered microporous membrane. The inventive MD/TD/Calendering process for manufacturing a PE/PP/PE microporous membrane may provide an inventive approach to 1) overcoming the thinness limitation of MD stretching-only process and produce thicknesses less than 10 μm, 2) controlling the increase in porosity which may occur in the TD stretching process, 3) produce a mechanically stronger microporous membrane with improved TD tensile strength, 4) produce a separator membrane with higher surface tension to facilitate ease of coating and coating adhesion, and/or 5) produce a separator with lower pin removal.

A PE/PP/PE 'machine direction/transverse direction/calendered' trilayer microporous membrane that has a thickness less than 10 μm, may have several advantages that may improve battery design and performance. A 10 μm or less multilayer polyolefin microporous separator membrane may take up less space inside a battery and may allow for more electrode active material to be packed in a battery cell for higher energy density and higher rate capability. Furthermore the combination of a machine direction and subsequent transverse stretching step followed by a calendering step may provide a promising method to achieve a microporous membrane that has excellent machine direction tensile strength and transverse direction tensile strength together with controlled percent porosity and a thermal shutdown function while having a thickness less than 10 μm. The unexpected level of improvement in tensile properties of the inventive PE/PP/PE separator microporous membrane described herein produced using MD stretching, TD stretching and calendering may achieve the machine direction tensile strength and transverse direction tensile strength levels similar to that of wet process PP and/or PE-containing multilayer microporous membrane without the solvent or oil recovery and recycle complexities and costs associated with a wet process manufacturing process.

A PP/PE/PP 'machine direction/transverse direction/calendered' trilayer microporous membrane that has a thickness less than 10 μm, may have several advantages that may improve battery design and performance. A 10 μm or less multilayer polyolefin microporous separator membrane may take up less space inside a battery and may allow for more electrode active material to be packed in a battery cell for higher energy density and higher rate capability. Furthermore the combination of a machine direction and subsequent transverse stretching step followed by a calendering step may provide a promising method to achieve a microporous membrane that has excellent machine direction tensile strength and transverse direction tensile strength together with controlled percent porosity and a thermal shutdown function while having a thickness less than 10 μm. The unexpected level of improvement in tensile properties of the inventive PP/PE/PP separator microporous membrane described herein produced using MD stretching, TD stretching and calendering may achieve the machine direction tensile strength and transverse direction tensile strength levels similar to that of wet process PP and/or PE-containing multilayer microporous membrane without the solvent or oil recovery and recycle complexities and costs associated with a wet process manufacturing process.

A PP, PP/PP, or PP/PP/PP 'machine direction/transverse direction/calendered' single layer, bilayer, trilayer, or multilayer microporous membrane that has a thickness less than 10 μm, may have several advantages that may improve battery design and performance. A 10 μm or less single or multilayer polyolefin microporous separator membrane may take up less space inside a battery and may allow for more electrode active material to be packed in a battery cell for higher energy density and higher rate capability. Furthermore the combination of a machine direction and subsequent transverse stretching step followed by a calendering step may provide a promising method to achieve a microporous membrane that has excellent machine direction tensile strength and transverse direction tensile strength together with controlled percent porosity and a thermal shutdown function while having a thickness less than 10 μm. The unexpected level of improvement in tensile properties of the inventive PP, PP/PP, or PP/PP/PP inventive separator microporous membrane described herein produced using MD stretching, TD stretching and calendering may achieve the machine direction tensile strength and transverse direction tension tensile strength levels similar to or better than that of wet process PP and/or PE-containing multilayer microporous membranes without the solvent or oil recovery and recycle complexities and costs associated with a wet process manufacturing process, may have better oxidation resistance than PE, may provide higher temperature performance than PE, may have better coating adhesion than typical PP, or combinations thereof.

The present application is directed to novel or improved microporous single or multilayer battery separator membranes, membrane separators, or separators, and/or batteries or cells including such membranes or separators, and/or methods of making such membranes, separators, cells, and/or batteries, and/or methods of using such membranes, separators, cells, and/or batteries. In accordance with at least certain embodiments, the present invention is directed to a single layer or multilayer dry process polyolefin microporous membrane, membrane separator or separator (such as PP, PE, PP/PP, PE/PE, PP/PE, PP/PE/PP, PE/PP/PE, PE/PP/PP, PP/PE/PE, PE/PP/PP/PE, PP/PE/PE/PP, PP/PP/PP, PE/PE/PE, PP-PE, PP-PE/PP, PP-PE/PE, PP-PE/PP/PP-PE, PP-PE/PE/PP-PE, or the like) which is manufactured using the inventive process which includes machine direction stretching followed by transverse direction stretching (with or without MD relax, preferably with MD relax, such as with 10-90% MD relax, 20-80% MD relax, 30-70% MD relax, or 40-60% MD relax, or with at least 20% MD relax) and a subsequent calendering step as a means to reduce the thickness of the membrane, reduce the percent porosity of the membrane in a controlled manner and/or to improve transverse direction tensile strength. The inventive process may produce a 10 μm or less thick single layer or multilayer microporous membrane, separator membrane, base film, or separator that is easily coated with polymeric-ceramic coatings, has excellent mechanical strength properties due to its polypropylene layer(s) and/or a thermal shutdown function due to its polyethylene layer(s). The ratio of the thickness of the polypropylene and polyethylene layers in the inventive multilayer microporous membrane can be tailored to balance mechanical strength and thermal shutdown properties.

DETAILED DESCRIPTION OF THE INVENTION

In accordance with at least certain embodiments, the present invention is directed to a multilayer polyolefin membrane for a rechargeable lithium battery which is manufactured using a lamination process, a coextruded process or a combination of the two processes. In at least certain embodiments, the multilayer polyolefin membrane may include polypropylene and polyethylene, or a blend, mixture or copolymer of polypropylenes and polyethylenes. Two non-limiting examples of a multilayer polyolefin membrane may be a polypropylene/polyethylene/polypropylene (PP/PE/PP) microporous membrane and a polyethylene/polypropylene/polyethylene (PE/PP/PE) microporous membrane. Furthermore embodiments may be possible by changing the number of PP and PE layers in the multilayer membrane and alternating the order of stacking of PP and PE layers in the multilayer membrane.

Figure 1:
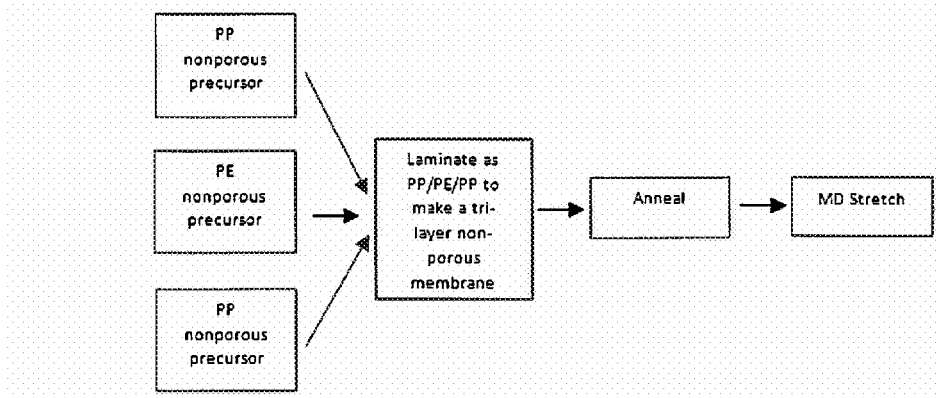
FIG. 1 is a schematic diagram of a manufacturing process for a MD uniaxial stretched trilayer polypropylene/polyethylene/polypropylene (PP/PE/PP) microporous membrane.
Figure 2:
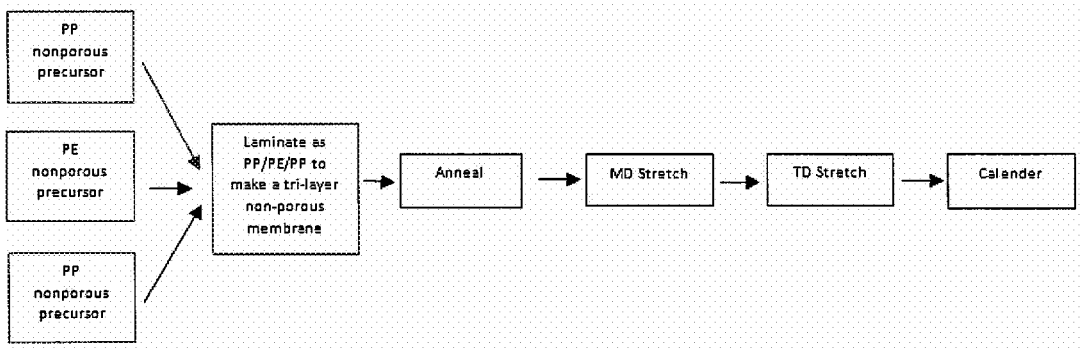
FIG. 2 is a schematic diagram of an inventive process described herein for manufacturing an MD/TD biaxial stretched and calendered (MD/TD/C) trilayer polypropylene/polyethylene/polypropylene (PP/PE/PP) microporous membrane.

FIG. 2 is a schematic of a manufacturing process for the polypropylene/polyethylene/polypropylene (PP/PE/PP) microporous membrane embodiment of the membrane described herein, where two layers of PP and one layer of PE are stacked with the PE layer as an inner layer and the two PP layers as outer layers forming a nonporous PP/PE/PP trilayer membrane. The stacked nonporous PP/PE/PP trilayer membrane is laminated to bond the layers together. The laminated nonporous trilayer is then annealed followed by a machine direction (MD) stretching step to make the membrane microporous. The inventive microporous PP/PE/PP trilayer membrane described herein is produced by transverse direction (TD) stretching of the MD stretched microporous PP/PE/PP trilayer membrane, followed by a subsequent calendering step of the 'MD-TD stretched' microporous PP/PE/PP trilayer membrane to reduce the membrane's thickness, reduce roughness, reduce percent porosity, increase TD tensile strength, increase uniformity, and/or reduce TD splittiness. A possibly preferred membrane or product may be manufactured using an exemplary inventive process described herein which includes stretching and a subsequent calendering step such as a machine direction stretching followed by transverse direction stretching (with or without machine direction relax) and a subsequent calendering step as a possibly preferred means to reduce the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator. The inventive process may produce 10 μm or less single or multilayer microporous membranes. In addition, the calendering process may use uniform or non-uniform heat, pressure and/or speed to selectively densify a heat sensitive material, to provide a uniform or non-uniform calender condition (such as by use of a smooth roll, rough roll, patterned roll, micro pattern roll, nano pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like.

Figure 3:
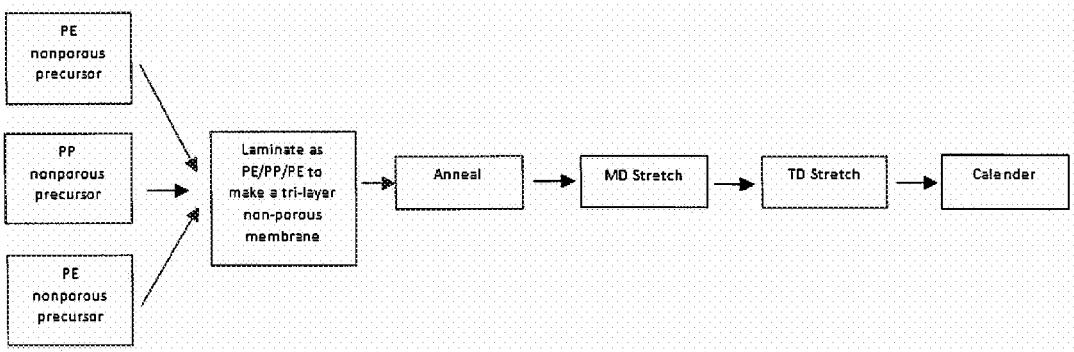
FIG. 3 is a schematic diagram of an inventive process described herein for manufacturing a MD/TD stretched and calendered trilayer polyethylene/polypropylene/polyethylene (PE/PP/PE) microporous membrane.

FIG. 3 is a schematic of a manufacturing process for the possibly preferred polyethylene/polypropylene/polyethylene (PE/PP/PE) microporous membrane embodiment of the inventive membrane described herein, where two layers of PE and one layer of PP are stacked with the PP layer as an inner layer and the two PE layers as outer layers forming a nonporous PE/PP/PE trilayer membrane. The stacked nonporous PE/PP/PE trilayer membrane is laminated to bond the layers together. The laminated nonporous trilayer is then annealed followed by a machine direction (MD) stretching step to make the membrane microporous. The inventive microporous PE/PP/PE trilayer membrane described herein is produced by transverse direction (TD) stretching of the MD stretched microporous PE/PP/PE trilayer membrane, followed by a subsequent calendering step of the 'MD-TD stretched' microporous PE/PP/PE trilayer membrane to reduce the membrane's thickness, reduce roughness, reduce percent porosity, increase TD tensile strength, increase uniformity, and/or reduce TD splittiness. A possibly preferred PE/PP/PE trilayer membrane or product may be manufactured using an exemplary inventive process described herein which includes stretching and a subsequent calendering step such as a machine direction stretching followed by transverse direction stretching (with or without machine direction relax) and a subsequent calendering step as a possibly preferred means to reduce the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator. The inventive process may produce 10 μm or less multilayer microporous membranes. In addition, the calendering process may use uniform or non-uniform heat, pressure and/or speed to selectively densify a heat sensitive material, to provide a uniform or non-uniform calender condition (such as by use of a smooth roll, rough roll, patterned roll, micro pattern roll, nano pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like.

Figure 4:
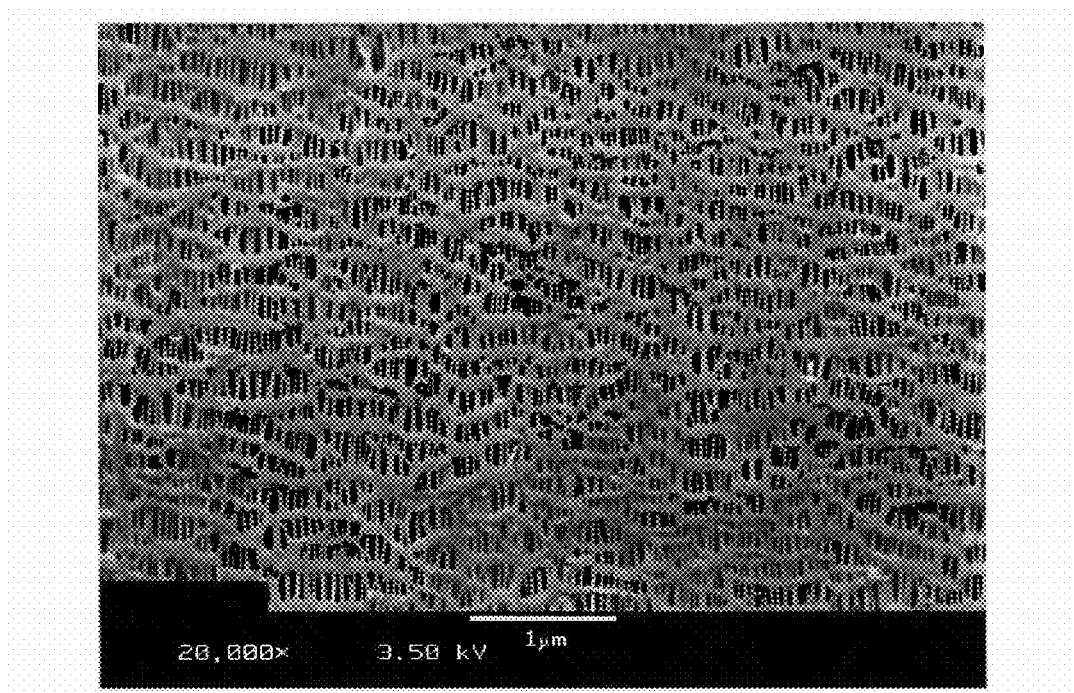
FIG. 4 is a Scanning Electron Micrograph (SEM) image of the surface of a Comparative Example 1 (CE 1) at a magnification 20,000×.

Table 1 lists membrane thickness information together with performance data on 'MD stretched', 'MD-TD stretched' and 'MD-TD-calendered' dry process comparative examples PP/PE/PP microporous trilayer membranes and membrane thickness information together with performance data on the 'MD-stretched', 'MD-TD stretched' and inventive 'MD-TD-calendered' PE/PP/PE inverse trilayer microporous membranes. Comparative Example 1 is a 38 μm PP/PE/PP microporous trilayer membrane which has been uniaxial MD stretched only. The ratio of the thickness of the PP and PE layers in Comparative Example 1 trilayer configuration is 0.33/0.33/0.33 (PP/PE/PP) indicating that the PP and PE layers are equivalent in thickness. The MD tensile strength and TD tensile strength of Comparative Example 1 are 1630 kgf/cm$^2$ and 165 kgf/cm$^2$, respectively, indicating that MD direction tensile strength is stronger than TD direction tensile strength when a membrane is stretched uniaxially in one direction (MD direction). FIG. 4 is a Scanning Electron micrograph of the surface of Comparative Example 1 showing the microporous structure may be composed of row nucleated crystalline lamellae with fibrillar tie chain-like structures interconnecting the crystalline lamellae. The pores have a rectangular slit-shape which is characteristic of dry process MD stretched microporous membranes.

Figure 5:
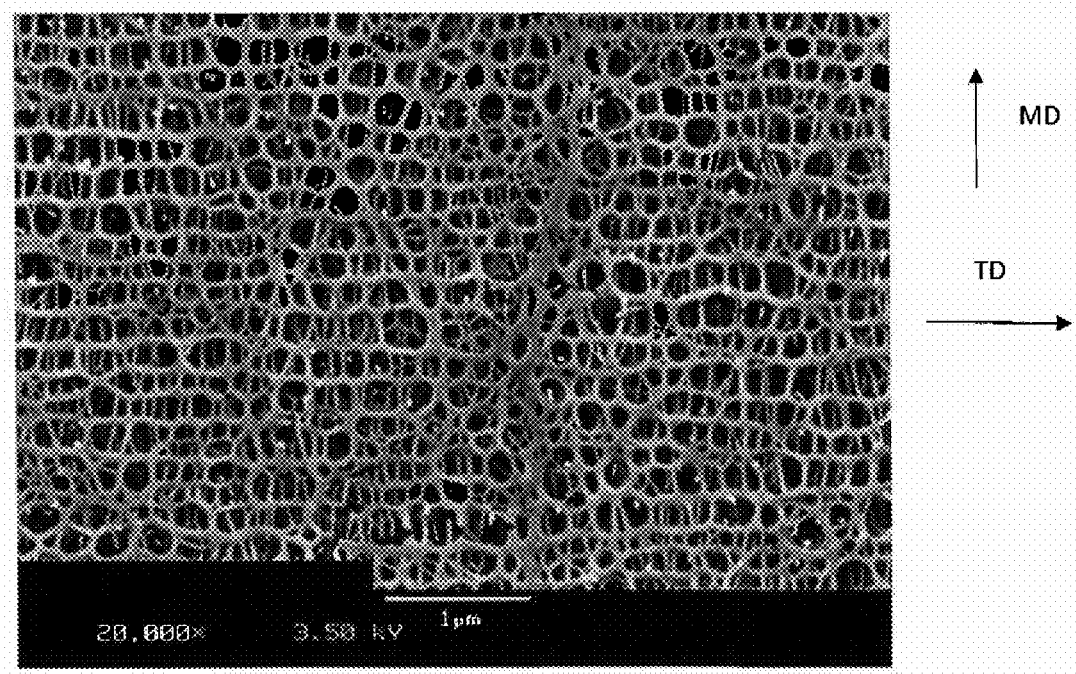
FIG. 5 is a Scanning Electron Micrograph (SEM) image of the surface of a Comparative Example 2 (CE 2) at a magnification 20,000×.
Figure 6:
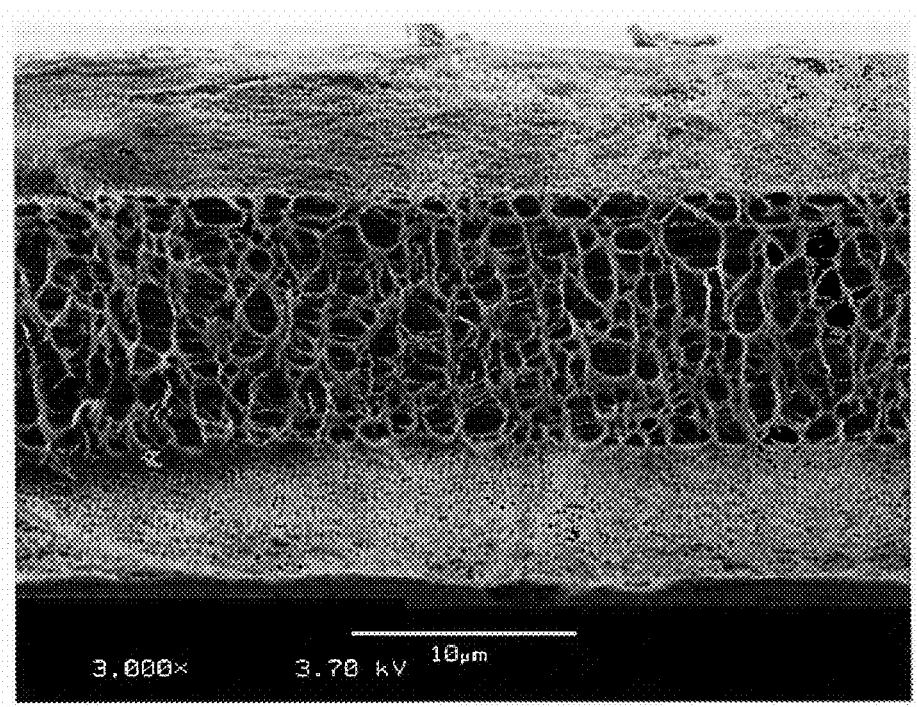
FIG. 6 is a Scanning Electron Micrograph (SEM) image of a cross sectional view of CE 2 at a magnification 3,000×.

TD stretching (in a direction perpendicular to MD) of Comparative Example 1 produces Comparative Example 2. FIG. 5 shows a SEM micrograph of Comparative Example 2 where the microstructure indicates transverse stretching appears to have a marked effect on the appearance of the row nucleated crystalline lamellae where the crystalline lamellae appear more elongated in a transverse direction. As a result, TD tensile strength of Comparative Example 2 is higher and may be nearly 40% higher than the TD tensile strength of Comparative example 1. This increase in TD tensile strength may be due to TD stretching on the crystalline lamellae and interconnecting fibrillar structures. FIG. 6 is a cross sectional view of Comparative Example 2 showing the more open porous structure of the inner PE microporous layer sandwiched by outer PP microporous layers. The shape of the Comparative Example 2 MD/TD stretched pores may appear round-shaped.

Figure 7:
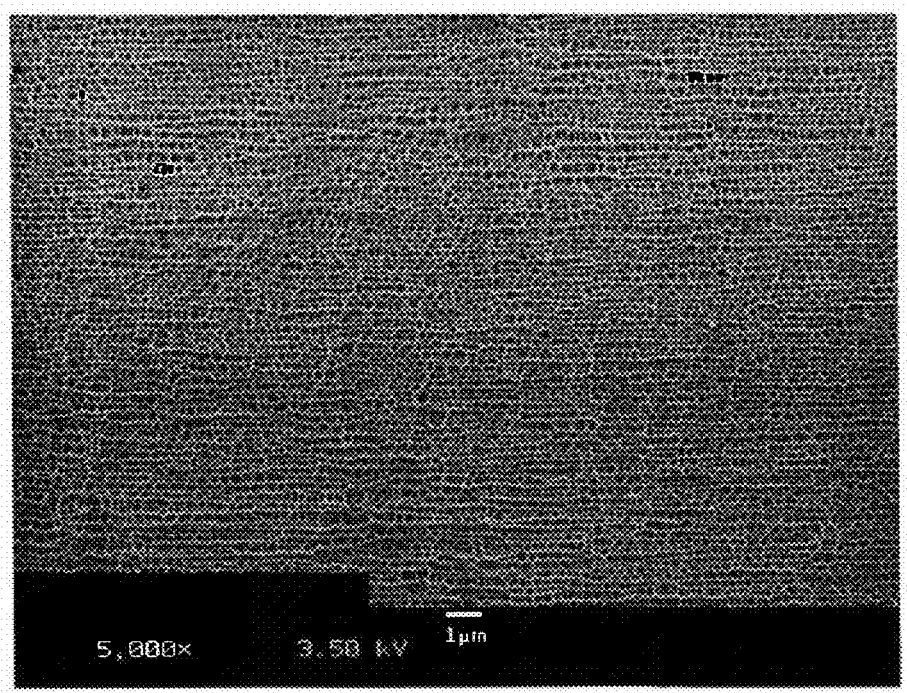
FIG. 7 is a Scanning Electron Micrograph (SEM) image of the surface of a Comparative Example 3 (CE 3) at a magnification 5,000×.

FIG. 7 shows the SEM micrograph of the surface of Comparative Example 2 at a magnification of 5,000×.

Figure 8:
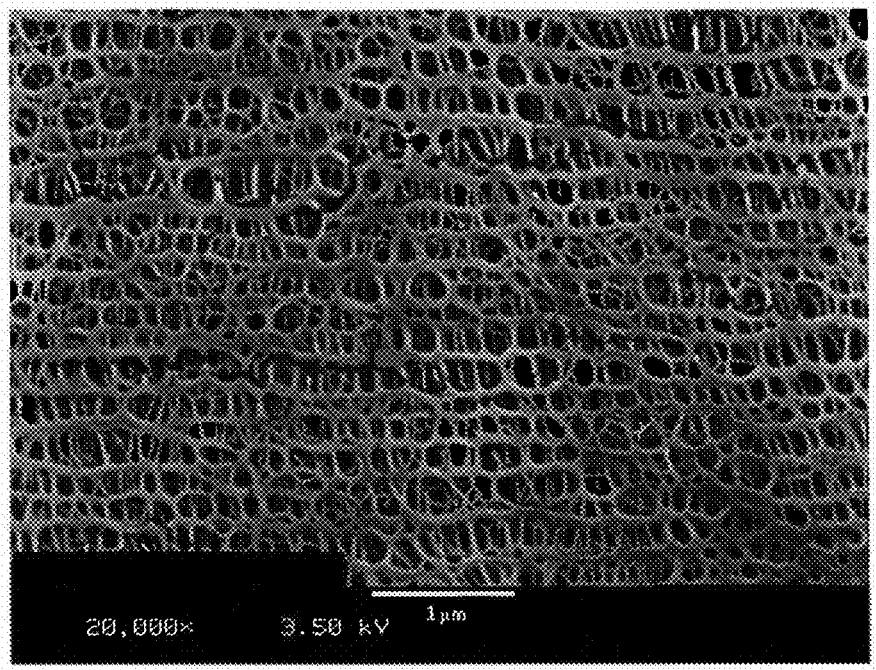
FIG. 8 is a Scanning Electron Micrograph (SEM) image of the surface of CE 3 at a magnification 20,000×.
Figure 9:
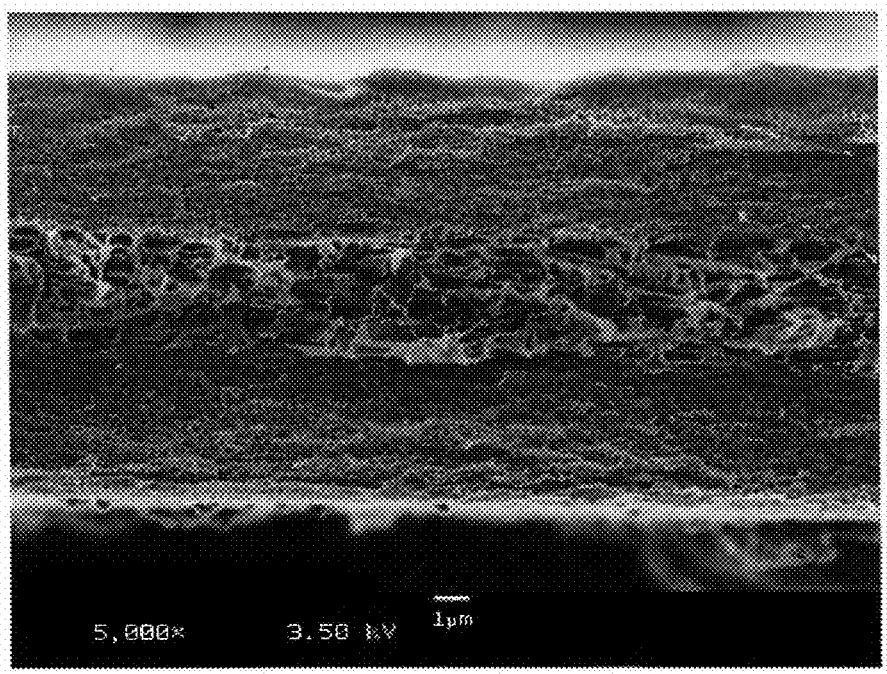
FIG. 9 is a Scanning Electron Micrograph (SEM) image of a cross sectional view of CE 3 at a magnification 5,000×.

The process described herein in FIG. 2 includes a 'combined TD stretching and subsequent calendering' of a MD stretched Comparative Example 3 (MD/TD/C) microporous membrane may be produced by calendering Comparative Example 2. The calendering process involves heat and pressure and may reduce the thickness of the membrane in a controlled fashion. The surface of Comparative Example 3 is shown at 20,000× magnification in FIG. 8. A cross sectional view of Comparative Example 3 is show in FIG. 9 where the inner PE layer may appear to be condensed and densified as compared to FIG. 6. The membrane thickness of Comparative Example 3 is reduced from 27.4 µm to 10.3 µm after combined TD stretching and subsequent calendering. A thin microporous membrane is desirable as a separator membrane for a rechargeable lithium ion battery because a thinner separator membrane allows more anode/separator/cathode material to be placed in a battery resulting in a higher energy and higher power density battery.

While the multilayer PP/PE/PP separator membrane has enjoyed great commercial success as a separator membrane in a lithium ion high energy, high power density rechargeable battery, battery manufacturers for mobile and electric vehicle applications are showing keen interest in coating the microporous separator membrane with a polymeric-ceramic containing coating in order to improve the thermal safety of a battery. Due to the relatively low surface tension of polypropylene (30 to 32 dyne-cm) as compared to polyethylene (34 to 36 dyne-cm), polyethylene may be easier to coat than PP when the coating is a polymeric-ceramic coating. In addition, PE is known to have lower pin removal than PP in the battery cell winding process. The present MD/TD/C process of the PP/PE/PP membrane (or of a PP, PP/PP, or PP/PP/PP membrane) can enhance coating adhesion and reduce pin removal of the outer PP layers or outer PP surfaces.

In accordance with at least selected embodiments, the present application is directed to a novel or improved microporous multilayer dry process battery separator membrane, separators, batteries including such separators, methods of making such membranes, separators, and/or batteries, and/or methods of using such membranes, separators and/or batteries where polyethylene, a blend of different polyethylenes or a mixture of polyethylene and polypropylene are used as outer layers of a multilayer microporous membrane and polypropylene may be used as an inner layer(s). In accordance with at least certain embodiments, the present invention is directed to a multilayer polyolefin microporous membrane where polyethylene, a blend of different polyethylenes or a mixture of polyethylene and polypropylene are used in one or more outer layers of a multilayer microporous membrane and polypropylene may be used as one or more inner layers where the lay-up configuration maybe, but is not limited to, PE/PP/PE.

Figure 19:
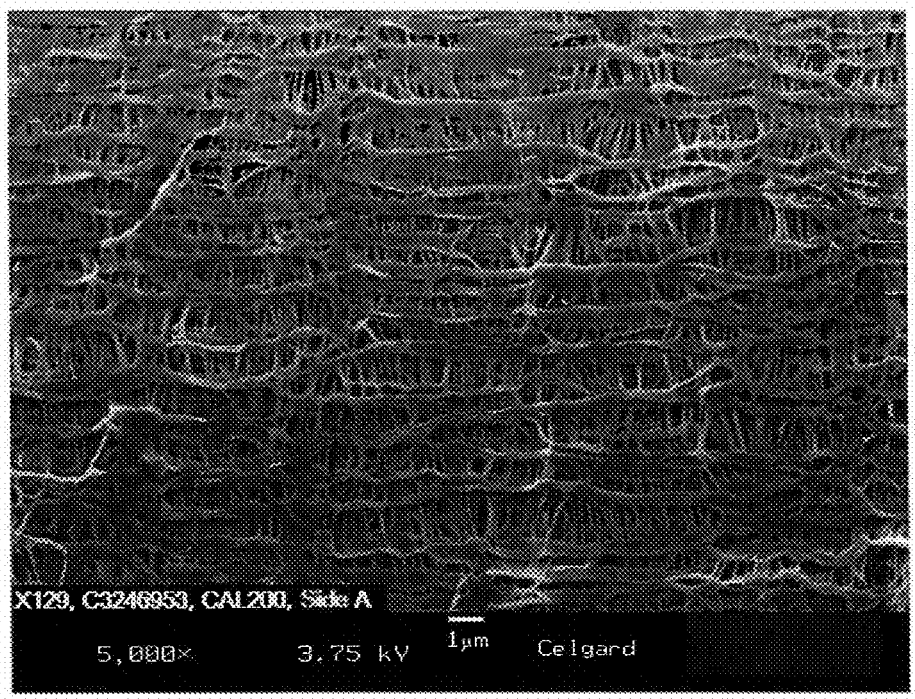
FIG. 19 is a Scanning Electron Micrograph (SEM) image of the surface of Example 1 PE/PP/PE after MD stretching, TD stretching, and calendering at a magnification of 5,000×.
Figure 21:
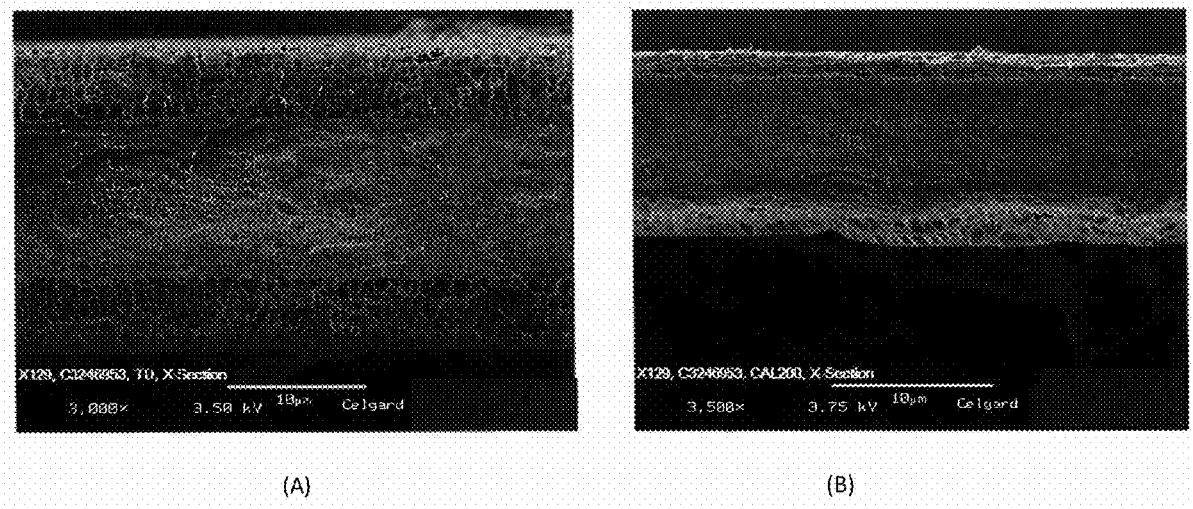
FIG. 21 is before and after Scanning Electron Micrograph (SEM) images of cross sectional views showing symmetrical calendering of Comparative Example 5 after TD stretching on the left (A) and the same membrane after calendering on the right (B) at a magnification of 3,000× and 3,500× respectively. Both the top and bottom polyethylene layers were reduced to 1.8 μm. Note that Comparative Example 4 (MD only) can be a precursor for Comparative Example 5 (MD and TD) and that Comparative Example 5 (MD/TD) can be a precursor for Example 1 (MD/TD/C).
Figure 22:
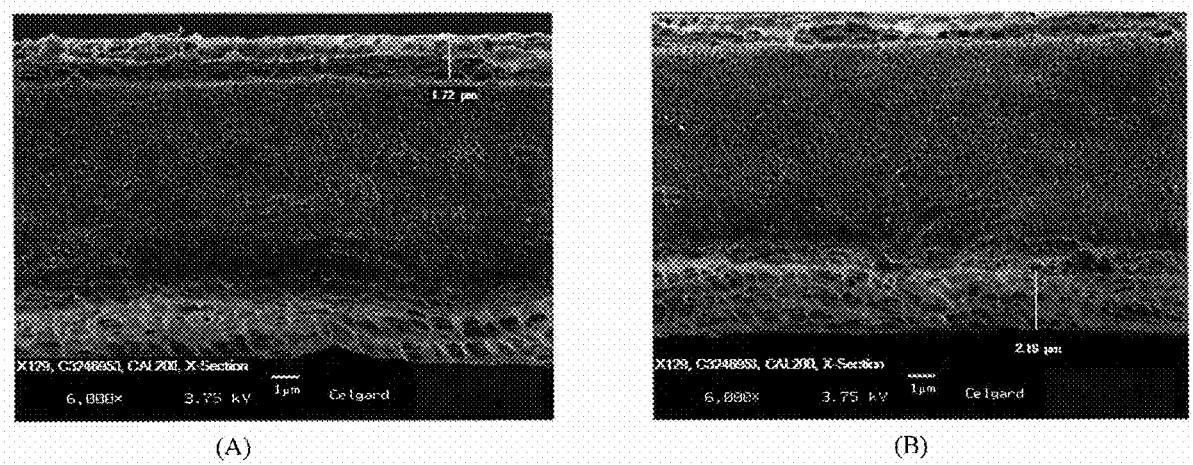
FIG. 22 is side by side Scanning Electron Micrograph (SEM) images of cross sectional views showing asymmetrical calendering of Comparative Example 5 after calendering on a magnification of 6,000×. The top polyethylene layer was reduced to 1.72 μm and the bottom layer to 2.19 μm.

In accordance with at least selected embodiments, the present application is directed to, but is not limited to, a PE/PP/PE dry microporous membrane which is manufactured using a combination of machine direction, transverse direction and calendering steps as shown in FIG. 3. The order of these three steps is important in the overall separator and battery performance properties of the PE/PP/PE microporous membrane. MD stretching may provide rectangular slit-shaped micropores, whereas the TD stretching may alter the amount of crystallinity and the amorphous content of membrane resulting in an improvement in TD tensile strength, reduced splittiness and higher percent porosity. The resulting pore shape of an outer PP layer after biaxial stretching is substantially round pores (FIG. 5), whereas FIG. 17 demonstrates resulting pore shape after biaxial stretching of a PE outer layer (pores that have an ellipsoid appearance). The ellipsoid pore is characterized by a flattened top and rounded edges. FIG. 19 shows what the pores of FIG. 17 look like after calendering (MD/TD/C). The compressed ellipticity of the biaxially stretched and calendered porous membrane (FIG. 19) may contribute to increased compression resistance or reduced spring back capacity. Combining MD and TD with a subsequent calendering step may produce an overall thinner PE/PP/PE microporous membrane. FIG. 21 shows a 21 µm biaxially stretched inverted trilayer porous membrane reduced to an 11.5 µm porous membranes post-calendering, a 50% reduction in thickness. The outer polyethylene layers were reduced by approximately 64% from approximately 5 µm each to approximately 1.8 µm each. The inner polypropylene layer was reduced from approximately 11 µm to approximately 7.7 µm. FIG. 21 demonstrates symmetrical reduction of layer thickness, while FIG. 22 demonstrates that the reduction in thickness may be selectively asymmetrical. In this example the top polyethylene layer was reduced to 1.72 µm and the bottom layer was reduced to 2.19 µm. The asymmetric or controlled calendering may provide optimal or controlled protection of dendrite growth (anode side) and oxidation resistance (cathode side). TD stretching may involve an increase in percent porosity in the microporous membrane. A calendering step following TD stretching may provide as means to modify the increase in percent porosity which may occur during TD stretching, and lower the overall percent porosity of the MD/TD/Calendered microporous membrane. Table 1 demonstrates the increase in porosity that comes after TD stretching and the reduction in porosity after calendering. In the monolayer polypropylene examples after calendering the porosity is returned to it is MD stretching value, from 66% back to 40%.

TABLE 1

| | PP Monolayer | | | | | | P/E/P | | | | | |
|---|---|---|---|---|---|---|---|---|---|---|---|---|
| | EZ1290 | | | EZ2590 | | | 2340 | | | 2340(8313) | | |
| Property | MD | TD | TDC | MD | TD | TDC | MD | TD | TDC | MD | TD | TDC |
| Thickness | 26 | 11 | 12 | 56 | 25 | 15 | 39.2 | 19.8 | 15 | 37.6 | 25.8 | 135 |
| Porosity | 40 | 76 | | 40 | 66 | 41 | 42.7 | 59.5 | 52 | 43.9 | 60.4 | 52.79 |

TABLE 1-continued

| Gurley | 370 | 35 | 129 | 900 | 66 | 246 | 711.8 | 47.1 | 89 | 1015 | 40 | 148 |
|---|---|---|---|---|---|---|---|---|---|---|---|---|
| Puncture | 488.5 | 190.2 | | 800 | 425 | 440 | 704.4 | 226 | 314 | 677.5 | 296 | 295 |
| MD Tensile | 1700 | 677 | | 1900 | 870 | 1351 | 1720.1 | 682 | 849 | 1808.8 | 621 | 1127 |
| TD Tensile | 150 | 535 | | 150 | 550 | 687 | 132.3 | 440.3 | 431 | 140.6 | 313 | 528 |

| | E/P/E | | | | | |
|---|---|---|---|---|---|---|
| | X137 | | | X129 | | |
| Property | MD | TD | TDC | MD | TD | TDC |
| Thickness | 55.3 | 33.4 | 24 | 35.6 | 25.5 | 13.2 |
| Porosity | 38.38 | 67.3 | 54.02 | 43.7 | 68.81 | 53 |
| Gurley | 1550 | 70.2 | 105 | 563.9 | 34 | 51 |
| Puncture | 629.2 | 261.7 | 316 | 427.5 | 198.1 | 201 |
| MD Tensile | 1955.3 | 650 | 1186 | 1801.7 | 539.5 | 927 |
| TD Tensile | 157 | 353.4 | 388 | 147.4 | 315.5 | 473 |

The inventive MD/TD/Calendering process for manufacturing a PE/PP/PE microporous membrane may provide an inventive approach to 1) overcoming the thinness limitation of MD stretching-only process and produce thicknesses less than 10 µm, 2) controlling the increase in porosity which may occur in the TD stretching process, 3) produce a mechanically stronger microporous membrane with improved TD tensile strength, 4) produce a separator membrane with higher surface tension to facilitate ease of coating and excellent coating adhesion and 5) produce a separator with lower pin removal than a separator having outer PP layers which may produce higher battery cell yields in the winding step in the manufacture of a lithium ion battery using PE/PP/PE trilayer configuration.

Figure 23:
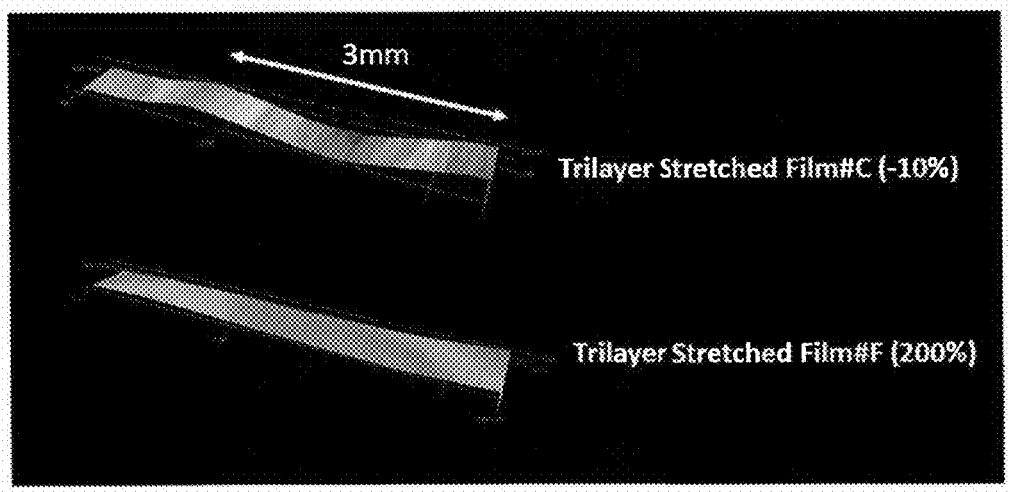
FIG. 23 shows respective surface roughness diagrams of respective stretched trilayer films at −10% TD and 200% TD stretch respectively.
Figure 24:
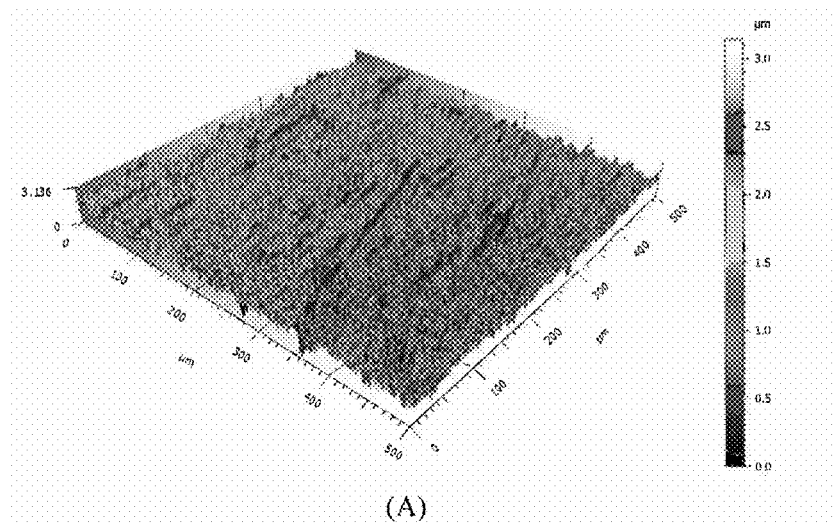
FIG. 24 shows 3-D quantification diagrams of surface roughness of TD stretched trilayer film (A) vs TD stretched trilayer film (B).
Figure 24:
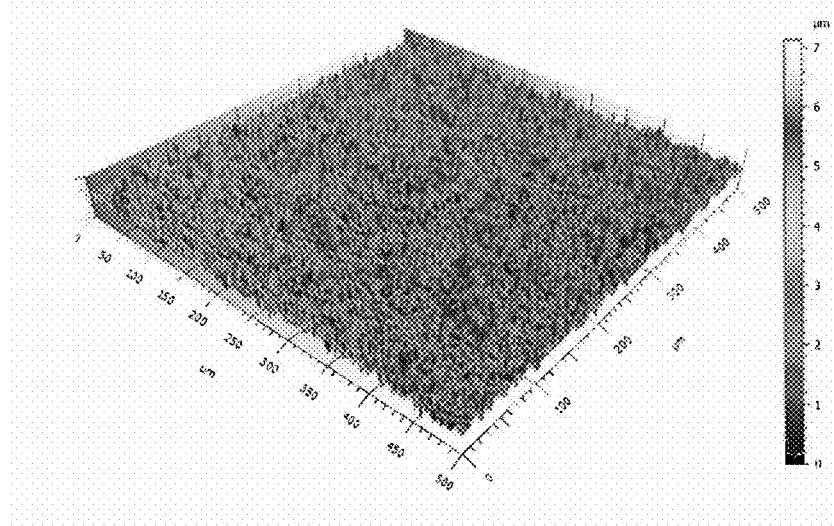

When stretching membranes in the MD and TD directions and subsequently calendering as described herein, the membranes may have several improved characteristics including improved mechanical strength in a thinner separator. Some of the resulting membranes however may have reduced permeability. To prevent lowering the permeability below a desired level, the surface roughness may be controlled. Analysis of membranes with trilayer constructions show a significant amount of surface roughness prior to TD stretching. The multilayer construction overall provides improved mechanical strength as compared to a monolayer construction. When coupled with its innate surface roughness characteristics, an improved stretched and/or calendered multilayer membrane may also have improved pin removal performance (reduced COF). Analysis also shows that when multilayer membranes are stretched in the TD direction the surface of the membrane may become less rough (or have a more uniform surface roughness which can also reduce pin removal forces, enhance thickness uniformity, etc.) and when multilayer membranes are stretched in the TD direction and then calendered the surface of the membrane may become even less rough (or have a more uniform surface roughness or a controlled surface roughness (which can also reduce or control pin removal forces, enhance or control thickness uniformity, etc.). FIG. 23 shows a 3-dimensional laser scanning microscope image of a trilayer 2.1×MD only stretched film (−10% TD) and shows a 4.5×TD stretched trilayer film (200%). The surface roughness is significantly reduced in the TD stretched film. Those films with increased or controlled roughness on either a milli or micro scale may have improved pin removal performance. FIG. 24 shows a quantification of the membranes' roughness pre (A) and post TD stretching (B). Table 2 shows surface roughness (low vs high thickness) and the resultant COF.

TABLE 2

| Sample | Sa(µm) | Sz(µm) | COF |
|---|---|---|---|
| A | 0.258 | 3.14 | 0.368 |
| B | 0.234 | 2.77 | 0.357 |
| X129TD | 1.169 | 13.22 | 0.231 |
| X129TDC | 0.586 | 7.14 | 0.281 |
| C | 0.272 | 3.01 | 0.361 |

Figure 25:
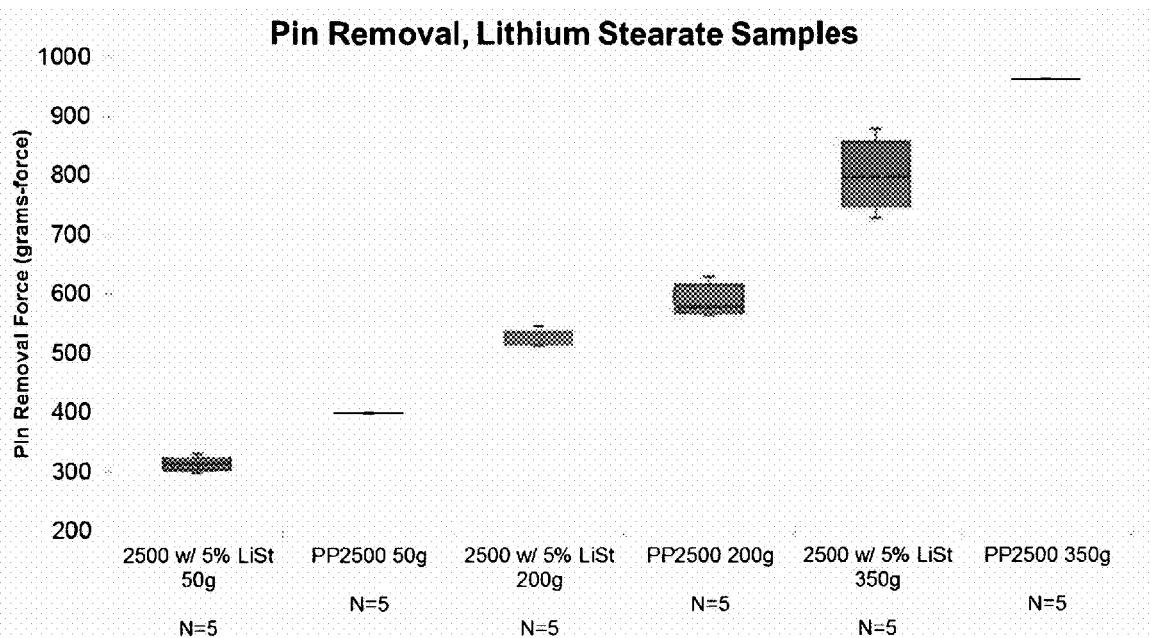
FIG. 25 is a graph depicting the pin removal performance after the incorporation of lithium stearate.
Figure 26:
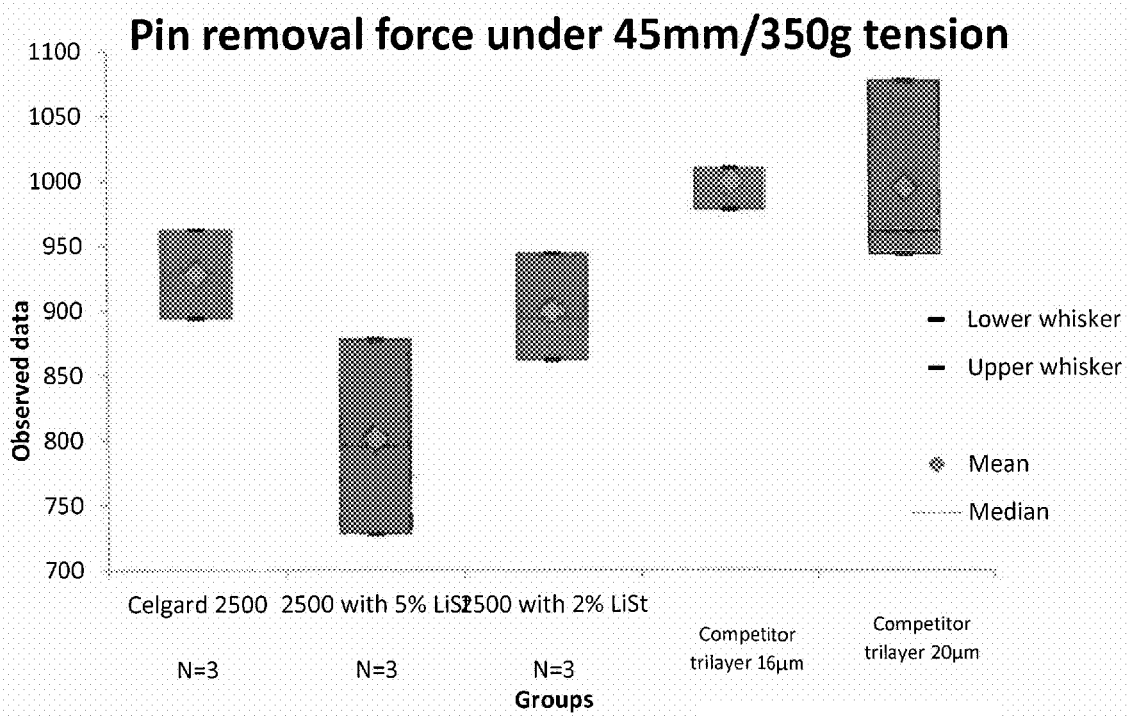
FIG. 26 is a graph depicting the pin removal performance with 0%, 5%, and 2% lithium stearate incorporated as compared to comparative competitor trilayer membranes.

After TD stretching and/or calendering there may be a decrease in surface roughness. To prevent reduced permeability post TD stretching, an inventive non-uniform, patterned or roughened calendering roll (or controlled non-uniform calendering) may be used to intentionally rebuild or control the surface roughness, to control tortuosity, to control the reduction in permeability, to control pin removal or COF, to control uniformity, to control coatability, to control mechanical strength, to control compressibility and/or bounce back, to control hot tip hole propagation, to control thickness, or combinations thereof. The use of such inventive calender rolls may improve pin removal and increase the membranes tortuosity. When examining and evaluating the high temperature melt integrity (HTMI) properties of a TD stretched and "roughened" calender membranes, the hot tip hole propagation test may be deployed. This test may show that those membranes that have been TD stretched and calendered with roughened calender rolls that the resulting hole after hot hip contact is significantly smaller. As previously stated, a roughened surface may help to improve pin removal performance. Table 2 lists the COF and roughness measurements. COF and roughness is correlated. Pin removal performance may also be improved in TD stretched and calendered membranes by incorporating additives into the membrane, along the surface of, and/or in the resin mix. Metallic stearates may be further incorporated into TD stretched and calendered films to improve pin removal performance (and a reduction in COF). FIG. 25 demonstrates the effect of incorporating lithium stearate (LiSt) into membranes. When adding 5% LiSt into membranes, the pin removal force was reduced at 50 g, 200 g, and 350 g when compared to control samples with no LiSt. The incorporation of LiSt in monolayer membranes shows improved pin removal performance even when compared with comparative competitive trilayer membranes. In TD stretched and calendered samples with LiSt incorporated there may be improvements not only in pin removal performance but also lower Gurley performance. The incorporation of LiSt may also increase melting point temperature from approximately 155° C. to approximately 220° C. and broaden the melt flow index (MFI) range from approximately 1.2-1.7 to 0.4-5.0, making the resulting membrane suitable for higher temperatures. In certain instances the incorporation of LiSt may also allow for the membranes to be extruded at lower temperatures of approximately 10-30° C. depending on the resin MFI, acting as a plasticizer. Calendering with a roughened, patterned or non-uniform roll may also improve pin removal, wettability, adhesion, and/or the like.

In accordance with selected embodiments, one may add one or more metallic stearates (such as lithium, sodium, calcium, magnesium, zinc, and combinations thereof, such as lithium and calcium stearates). Lithium stearate and/or calcium stearate is preferred. LiSt can serve as a surfactant or wetting agent and to reduce pin removal and/or the COF, especially for the surface of a PP layer or membrane. In accordance with selected embodiments, there may be provided a method for removing a pin from a battery assembly by the step of providing a separator comprising: a microporous membrane having an exterior surface portion of polypropylene, the polypropylene including at least 500 ppm of metallic stearate, preferably lithium stearate and/or calcium stearate.

A PE/PP/PE 'machine direction/transverse direction/calendered' trilayer microporous membrane that has a thickness less than 10 μm, may have several advantages that may improve battery design and performance. A 10 μm or less multilayer polyolefin microporous separator membrane may take up less space inside a battery and may allow for more electrode active material to be packed in a battery cell for higher energy density and higher rate capability. Furthermore the combination of a machine direction and subsequent transverse stretching step followed by a calendering step may provide a promising method to achieve a microporous membrane that has excellent machine direction tensile strength and transverse direction tensile strength together with controlled percent porosity and a thermal shutdown function while having a thickness less than 10 μm. The unexpected level of improvement in tensile properties of the inventive PE/P/PE inventive separator microporous membrane described herein produced using MD stretching, TD stretching and calendering may achieve the machine direction tensile strength and transverse direction tensile strength levels similar to that of wet process PP and/or PE-containing multilayer microporous membrane without the environmental issues associated with a wet process manufacturing process.

Table 3 lists performance data on the comparative membranes and inventive membranes described herein. Comparative Example 4 is a 32.4 μm PE/PP/PE microporous trilayer membrane which has been MD stretched. The ratio of the thickness of the PP and PE layers in the PE/PP/PE trilayer configuration is 0.19/0.63/0.19 indicating that the outer PE layers are thinner than the inner PP layer.

TABLE 3

|  | CE 1 | CE 2 | CE 3 |
|---|---|---|---|
| Trilayer configuration | PP/PE/PP | PP/PE/PP | PP/PE/PP |
| PP/PE/PP ratio | .33/.33/.33 | .33/.33/.33 | .33/.33/.33 |
| Thickness, μm | 38 | 27.4 | 10.3 |
| Gurley JIS, s | 780 | 370 | 176 |
| MD tensile, kgf/cm$^2$ | 1630 | 610 | 1560 |
| TD tensile, kgf/cm$^2$ | 165 | 286 | 665 |
| MD % Elongation | 48 |  | 54 |
| TD % Elongation | 954 | 103 | 51 |
| Puncture Strength, | 686 | 295 | 179 |
| Electrical Resistance, ohm-cm$^2$ | 4.3 | na | 0.9 |

|  | CE 4 | CE 5 | Ex. 1 | Ex. 2 | Ex. 3 |
|---|---|---|---|---|---|
| Trilayer configuration | PE/PP/PE | PE/PP/PE | PE/PP/PE | PE/PP/PE | PE/PP/PE |
| PE/PP/PE ratio | .19/.63/.19 | .19/.63/.19 | .19/.63/.19 | .19/.63/.19 | .19/.63/.19 |
| Thickness, μm | 32.4 | 20.9 | 7.5 | 9.4 | 8.8 |
| Gurley JIS, s | 494 | 24.8 | 159 | 176 | 126 |
| MD tensile, kgf/cm$^2$ | 2078 | 573 | 1581 | 1173 | 1262 |
| TD tensile, kgf/cm$^2$ | 123 | 256 | 543 | 488 | 468 |
| MD % Elongation | 115 | 32 | 345 | 106 | 123 |
| TD % Elongation | 5.14 | 2.6 | 75 | 8.2 | 77 |
| Puncture Strength, | TBD | TBD | 160 | 165 | 167 |
| % Porosity | 46 | 68 | 40 | 33 | TBD |
| Electrical Resistance, ohm-cm$^2$ | 1.84 | 0.51 | 1.27 | 0.97 | 0.6 |
| Calendering Temperature, ° C. | na | na | 60 | 60 | 60 |
| Calendering Pressure, psi | na | na | 200 | 125 | 50 |
| Calendering Speed, ft/min. | na | na | 80 | 80 | 80 |

The MD tensile strength and TD tensile strength of Comparative Example 4 are 2078 kgf/cm$^2$ and 123 kgf/cm$^2$, respectively, indicating that MD direction tensile strength is stronger than TD direction tensile strength when a membrane is stretched uniaxially in one direction (MD direction).

TD stretching (in a direction perpendicular to MD) of Comparative Example 4 produces Comparative Example 5. As a result of TD stretching, TD tensile strength of Comparative Example 5 is more than double the TD tensile strength of Comparative Example 4. This increase in TD tensile strength may be due to TD stretching on the crystalline lamellae and interconnecting fibrillar structures.

Figure 10:
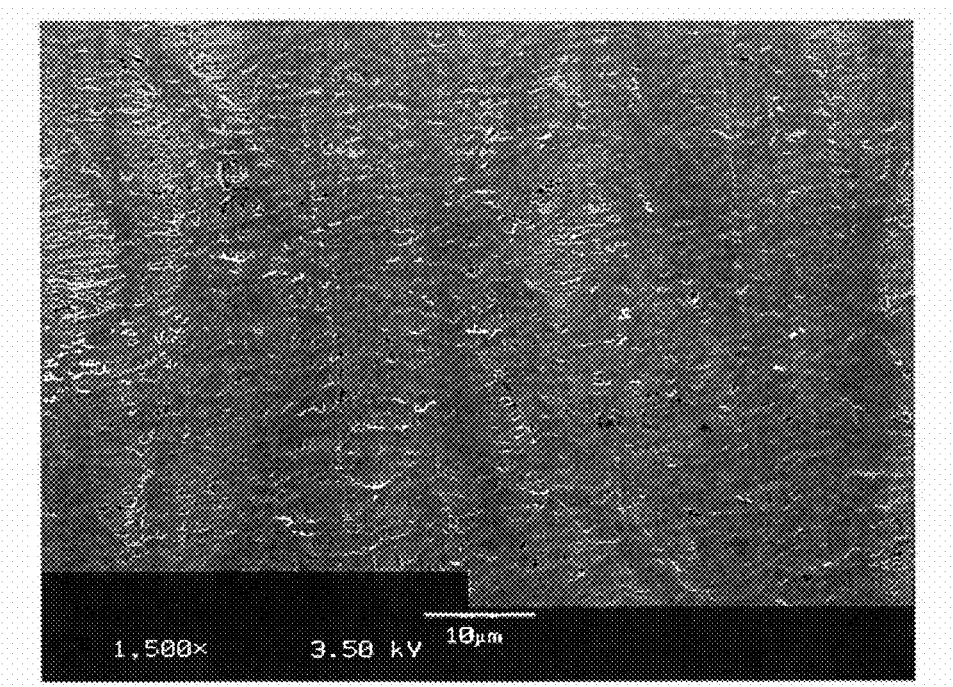
FIG. 10 is a Scanning Electron Micrograph (SEM) image of the surface of exemplary inventive Example 1 at a magnification 20,000×.

In at least certain embodiments, the TD tensile strength of the inventive membrane may be further improved by the addition of a Calendering step following TD stretching. The calendering process which involves heat and pressure may reduce the thickness of a porous membrane. FIG. 10 is an SEM micrograph of the surface of inventive Example 1 membrane where the surface of the PE/PP/PE porous membrane appears slightly modified due to the lower melting temperature of PE during the application of heat and pressure of the calendering step. However, the calendering process step may have recovered the loss in the MD and TD tensile strength caused by TD stretching. Furthermore, the increase observed in MD and TD tensile strength with calendering may create a more balanced ratio of MD and TD tensile strength which may be beneficial to the overall mechanical performance of the inventive membrane. Examples 2 and 3 may also be produced by varying the heat and pressure if the calendering conditions. Example 2 and 3 were produced using the same calendering temperature of 60 deg C. and a line speed of 60 ft/min as used in Example 1, while the calendering pressure was varied from 50 to 200 psi. The higher pressure may provide a thinner separator.

At least one inventive process described herein comprises a 'combined TD stretching and subsequent calendering' of a MD stretched microporous membrane. Using the inventive process described herein of a combined TD stretching and subsequent calendering, the membrane thicknesses of Example 1, Example 2 and Example 3 are 7.5 µm, 9.4 µm and 8.8 µm, respectively. A microporous membrane with a thickness less than 10 µm is desirable as a separator membrane for a rechargeable lithium ion battery because a thinner separator membrane allows more anode and cathode active material to be placed in a battery resulting in a higher energy and higher power density battery.

Figure 27:
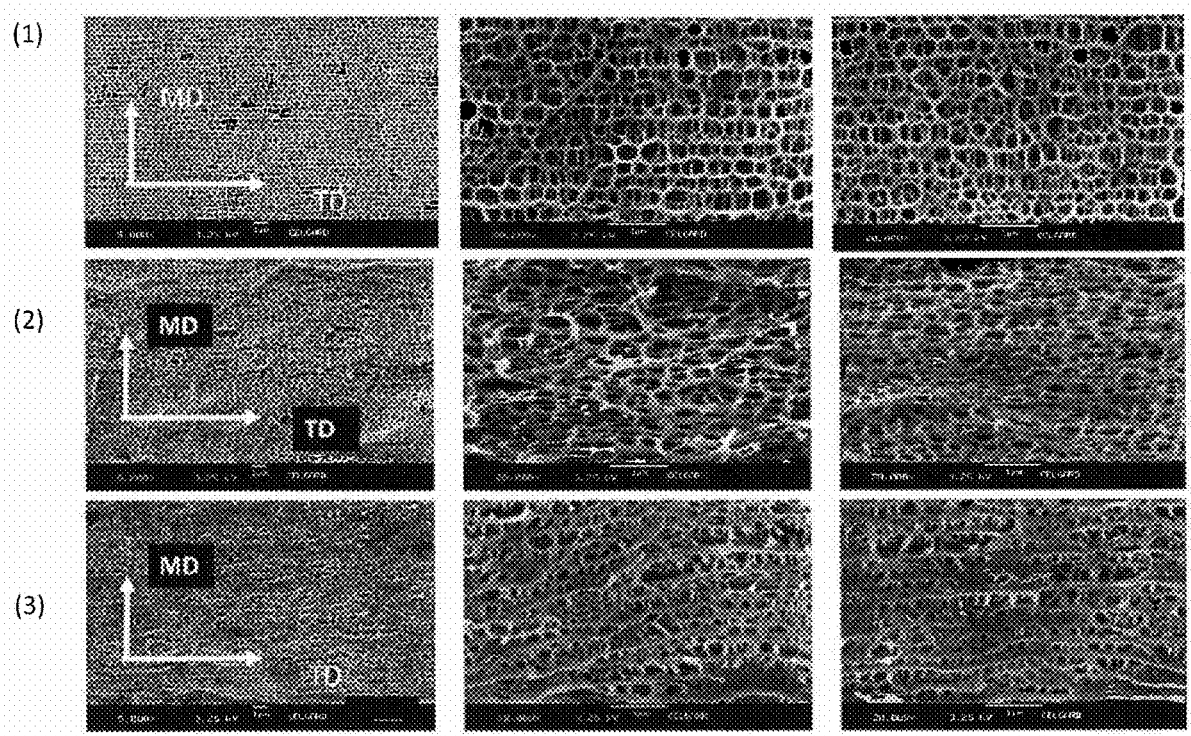
FIG. 27 is a set of nine Scanning Electron Micrograph (SEM) images of the surface of three different TD stretched products. Panel 1 (top row from left to right three SEMs) shows the TD stretched EZ2090 product membrane at 5,000×, 20,000× and 20,000× magnification. Panel 2 (center row from left to right three SEMs) shows the TD stretched EZ2090 product membrane that has been further TD stretched at 5,000×, 20,000× and 20,000× magnification. Panel 3 (bottom row from left to right three SEMs) shows the TD stretched EZ2090 product membrane that has been further TD stretched and calendered at 5,000×, 20,000× and 20,000× magnification.

In at least certain selected embodiments the improved separator may be a monolayer porous membrane that has been biaxially stretched and calendered. Table 4 list properties of biaxially stretched monolayer polypropylene (MD/TD) compared to biaxially stretched and calendered monolayer polypropylene (MD/TD/C). The calendered membrane is thinner by up to 50% while maintaining good ER performance and strength capabilities. FIG. 27 Panel 1 (top 3 SEMS) shows a biaxially stretched membrane (MD stretched, followed by TD stretched with MD relax) that has substantially round or spherical pores in a very uniform pattern in at least the outer PP layer thereof. FIG. 27 Panel 2 (middle 3 SEMS) shows a biaxially stretched membrane (MD stretched, followed by TD stretched with MD relax, followed by additional TD stretching) that has substantially oval or elongated in the TD shaped pores in at least the outer PP layer thereof. FIG. 27 Panel 3 (bottom 3 SEMS) shows a biaxially stretched and calendered membrane (MD stretched, followed by TD stretched with MD relax, followed by additional TD stretching, and then calendered [pressure or compression in the Z direction]) that has pores that are oval or ellipsoid in shape with condensed lamellae across the width in at least the outer or surface PP layer.

TABLE 4

| Properties | EZ2090 | MDTDC EZ2090 | EZ2590 | MDTDC EZ2590 |
|---|---|---|---|---|
| Thickness (um)/stdev | 20 | 10.64/0.37 | 25 | 16.4/0.50 |
| Porosity, % | 65% | 41% | 69% | 53% |
| Gurley (JIS), seconds | 65 | 144 | 66 | 150 |
| MD/TD Shrinkage @ 105 C. | 8.0/0.2 | 9.0/1.5 | 4.0/0.5 | 6.4/0.9 |
| MD/TD Shrinkage @ 120 C. | 12/0.5 | 12.1/2.3 | 8.5/0.5 | 8.9/2.2 |

TABLE 4-continued

| Properties | EZ2090 | MDTDC EZ2090 | EZ2590 | MDTDC EZ2590 |
|---|---|---|---|---|
| Puncture Strength, grams | 380 | 358 | 425 | 480 |
| MD Tensile (kg/cm2) | 950 | 1700 | 870 | 1252 |
| TD Tensile (kg/cm2) | 650 | 1146 | 550 | 655 |
| ER (ohm-cm2) | 0.7 | 0.93 | 0.8 | 1.0 |

Figure 11:
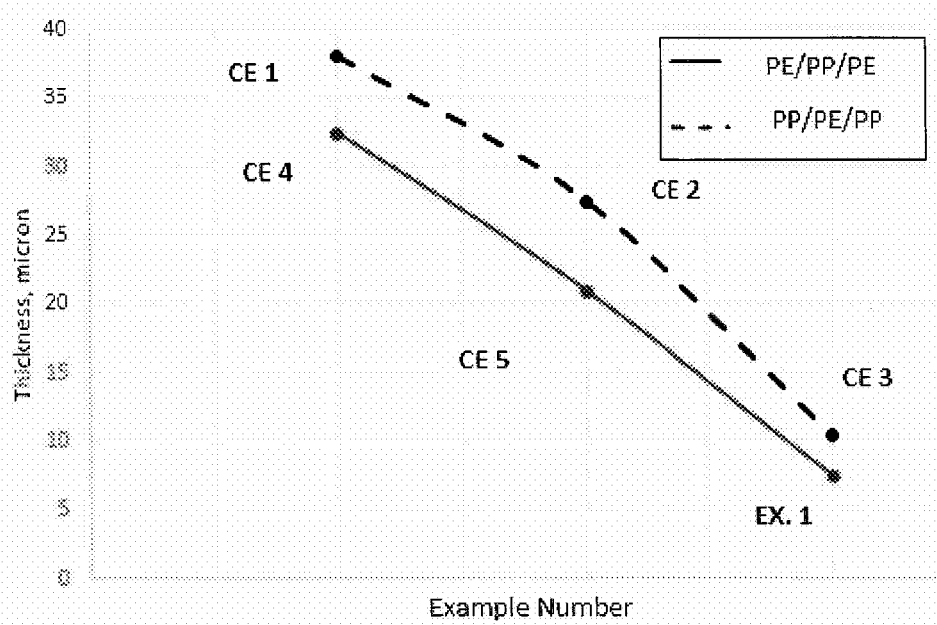
FIG. 11 is a graph that includes Thickness values of PP/PE/PP trilayer including Comparative Example 1, Comparative Example 2 and Comparative Example 3 and PE/PP/PE trilayer including Comparative Example 4, Comparative Example 5 and Example 1.

FIG. 11 is a plot of the thickness of PP/PE/PP and PE/PP/PE trilayer microporous membranes using MD stretch only, MD stretching followed by TD stretching, and the inventive process described herein of MD stretching followed by TD stretching and subsequent Calendering to prepare a PE/PP/PE microporous membrane. The thickness of the membrane is observed to decrease when the MD stretched membrane is TD stretched. Furthermore, calendering further reduces the thickness of the MD-TD stretched membrane. Calendering may provide a reliable method to reduce the thickness of a microporous membrane in a controlled fashion.

Figure 12:
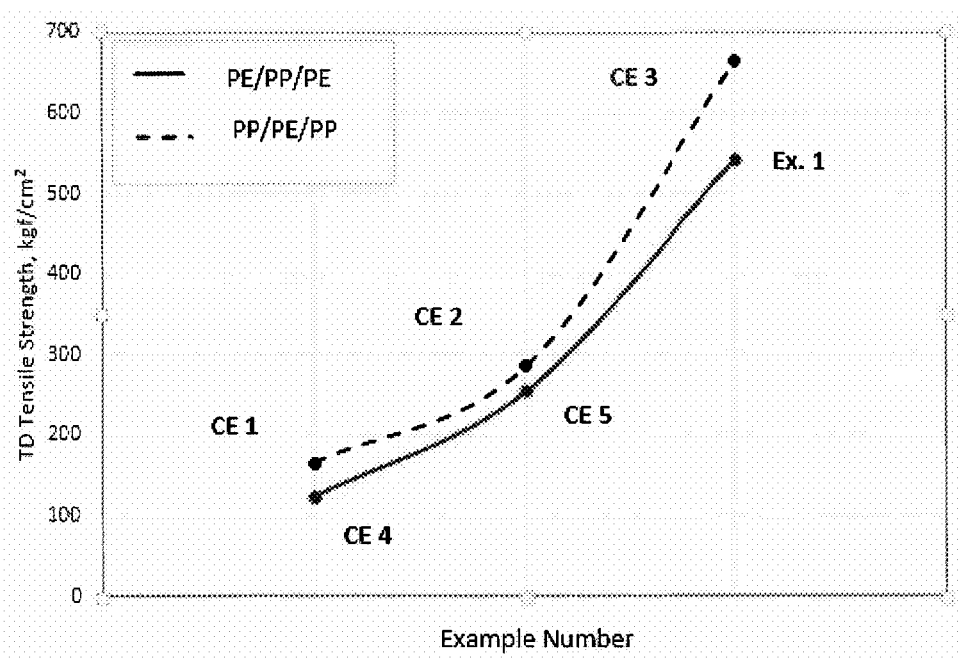
FIG. 12 is a graph that includes TD tensile strength values of PP/PE/PP trilayer including Comparative Example 1, Comparative Example 2 and Comparative Example 3 and PE/PP/PE trilayer including Comparative Example 4, Comparative Example 5 and Example 1.

FIG. 12 is a plot of the TD tensile strength of PP/PE/PP and PE/PP/PE trilayer microporous membranes using MD stretch only, MD stretching followed by TD stretching, and the inventive process described herein of MD stretching followed by TD stretching and subsequent Calendering to produce a MD/TD/Calendered PE/PP/PE microporous membrane. The TD tensile strength of the PP/PE/PP and PE/PP/PE trilayer microporous membranes may increase of approximately 4 to 5 fold when the membrane are produced using inventive process described herein which combines MD stretching followed by TD stretching and subsequent Calendering.

Figure 13:
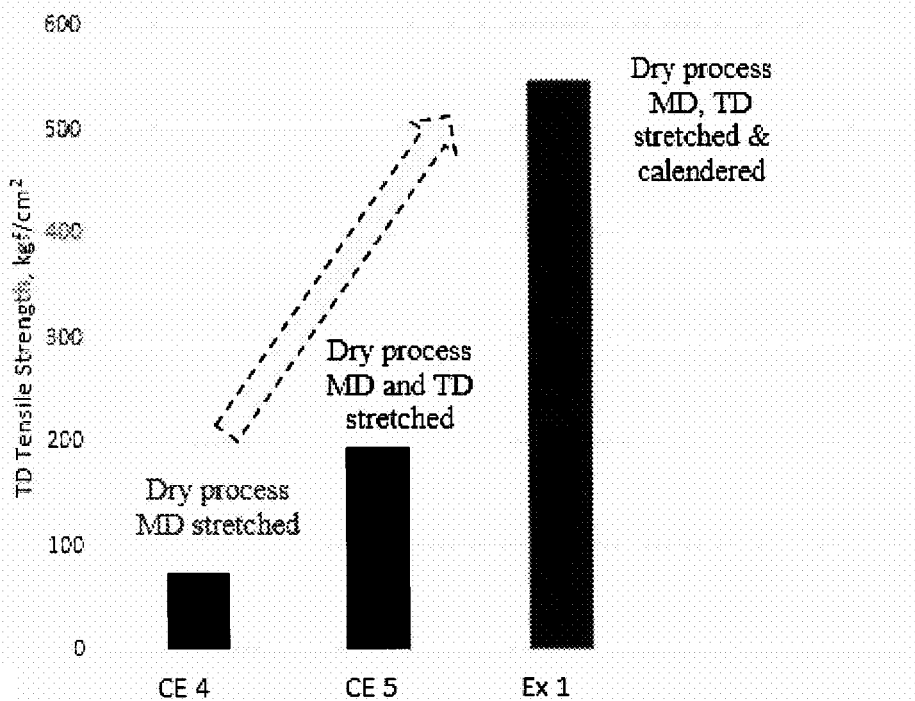
FIG. 13 is a bar chart that includes a comparison of TD tensile strength of dry process microporous membranes Comparative Examples 4, Comparative Examples 5 and Example 1.

FIG. 13 demonstrates the overall improvement in TD tensile strength of a dry process microporous membrane produced using the inventive process described herein of TD stretching and subsequent Calendering of a 'MD stretched' PE/PP/PE microporous membrane. The dry process manufacturing process which is an environmentally green, solvent-free manufacturing process may produce an MD/TD/Calendered PE/PP/PE microporous membrane with a marked increase in TD tensile strength. In at least certain selected embodiments the porous membranes may be MD and TD stretched and/or relaxed sequentially and/or simultaneously. The calendering step may be introduced before or after the stretching steps. The addition of calendering to the MD/TD stretching and/or relaxing of porous films may increase pore tortuosity contributing to an increase in mechanical strength, may reduce the effective porosity to microporous, and/or the like.

Figure 14:
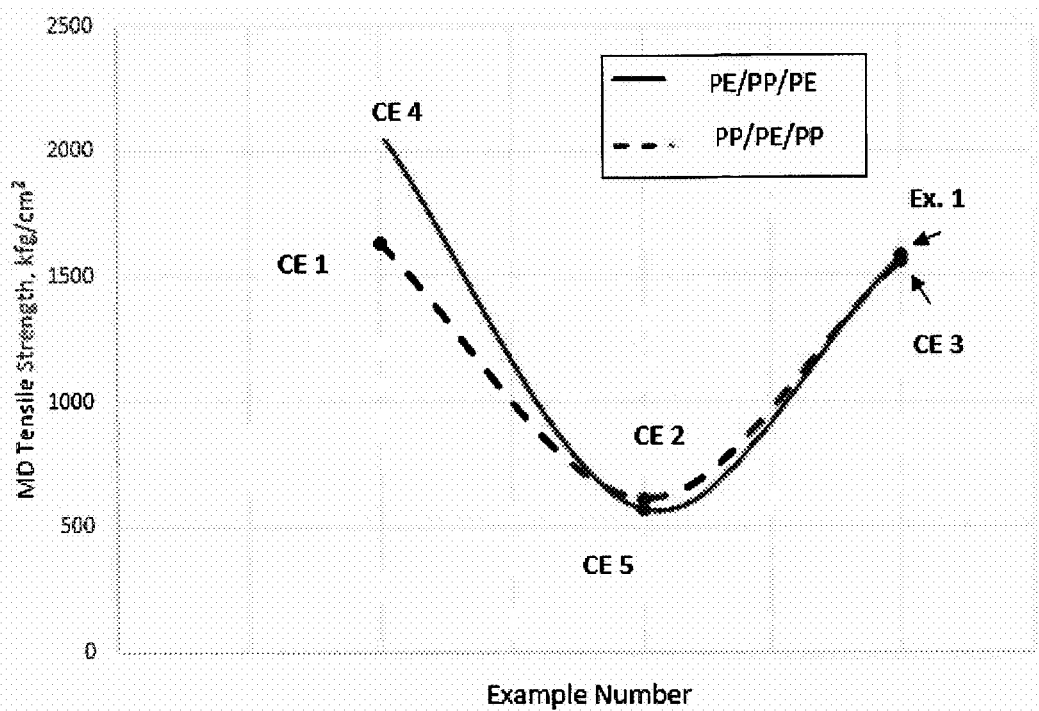
FIG. 14 is a graph that includes MD tensile strength values of PP/PE/PP trilayer including Comparative Example 1, Comparative Example 2 and Comparative Example 3 and PE/PP/PE trilayer including Comparative Example 4, Comparative Example 5 and Example 1.
Figure 15:
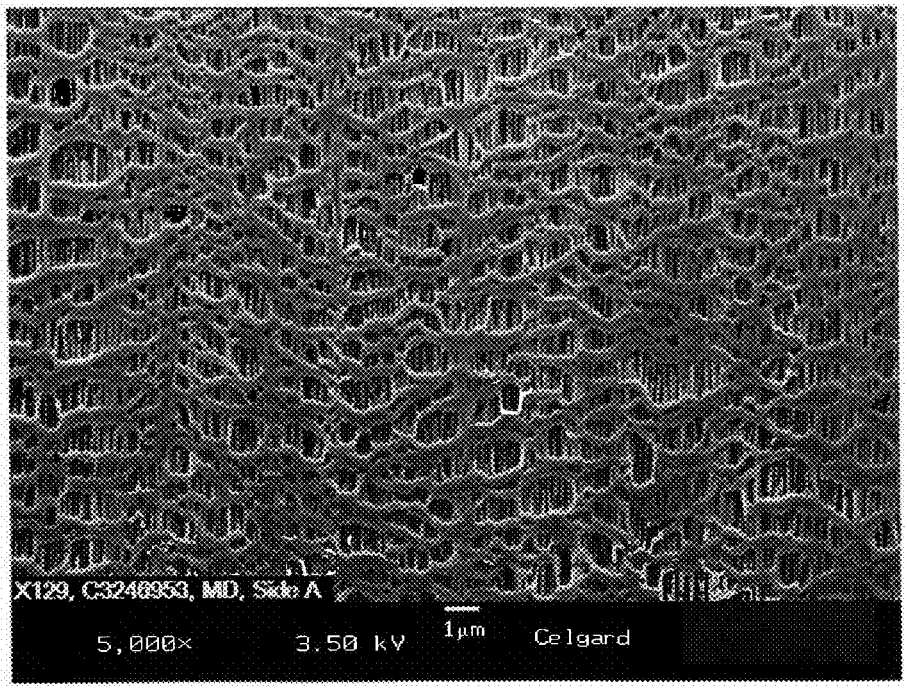
FIG. 15 is a Scanning Electron Micrograph (SEM) image of the surface of Comparative Example 4 PE/PP/PE after MD stretching at a magnification of 5,000×.
Figure 16:
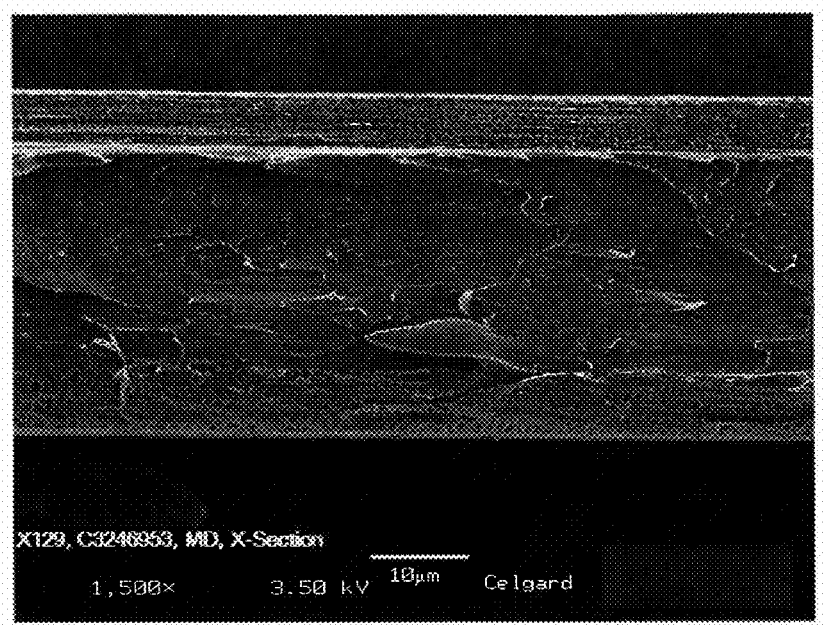
FIG. 16 is a Scanning Electron Micrograph (SEM) image of a cross sectional view of Comparative Example 4 at a magnification of 1,500×.

FIG. 14 is a plot of the MD tensile strength of PP/PE/PP and PE/PP/PE trilayer microporous membranes using MD stretch only, MD stretching followed by TD stretching, and the inventive process described herein of MD stretching followed by TD stretching and subsequent Calendering. TD stretching is observed to decrease the MD tensile strength of the PP/PE/PP and PE/PP/PE trilayer microporous membranes. However, subsequent calendering of the MD-subsequent TD stretched membranes may show a recovery of a portion of loss in MD tensile strength. More importantly, the calendering step has produced a membrane where the loss of MD tensile strength is offset by the gain in TD tensile strength. The inventive membrane described herein has a more balanced MD tensile strength and TD tensile strength which may be beneficial to the overall performance of the inventive separator in a battery. In addition, the present porosity has been reduced by approximately 40 to 50%. A controlled reduction in percent porosity to a desirable range to achieve excellent battery performance may be produced by the calendering step when it is performed subsequent to the TD stretching step. In at least certain selected embodiments to improve the MD to TD tensile strength balance and improve the mechanical strength by varying hot and cold stretch temperature conditions.

Due to the less than 10 μm thickness achieved by the possibly preferred inventive MD/TD/Calendered process, the PE/PP/PE microporous membrane produced by the process described herein may provide a thin substrate for polymeric-ceramic coating where the substrate may be easier to coat and have improved adhesion. The inventive microporous membrane PE/PP/PE trilayer configuration offers an excellent substrate for polymeric-ceramic coating where the coating may adhere well and also have excellent adhesion to both the separator substrate and to the electrode in a lithium ion rechargeable battery. A thin PE/PP/PE microporous separator membrane that is less than 10 um in thickness may have an overall thickness ranging from 14 to 17 um once coated with a coating layer with a thickness ranging from 4 to 7 um. In at least certain selected embodiments calendered porous films may be more uniform and provide an improved surface for coating.

Figure 18:
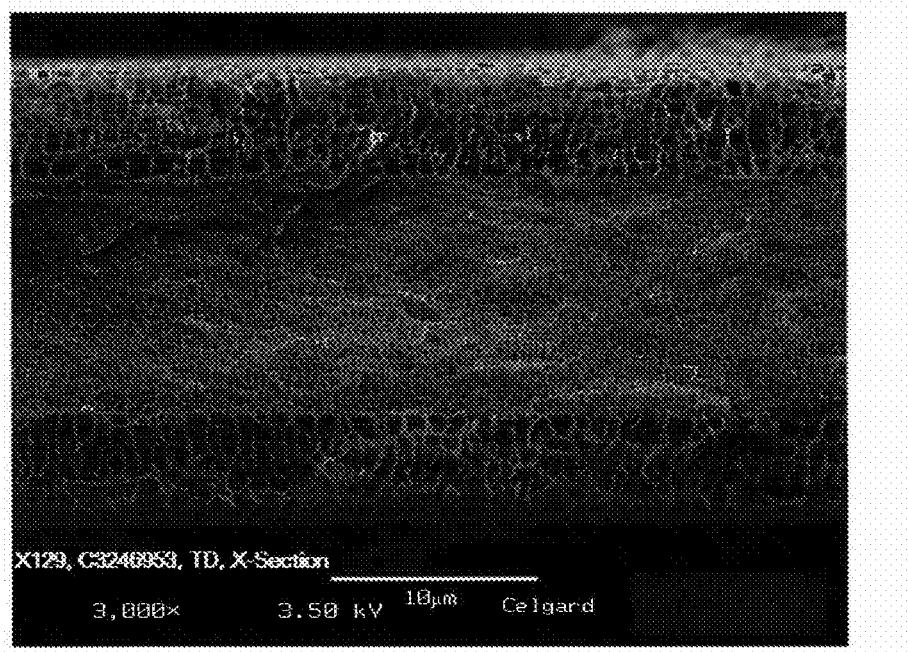
FIG. 18 is a Scanning Electron Micrograph (SEM) image of a cross sectional view of Comparative Example 5 at a magnification of 3,000×.
Figure 28:
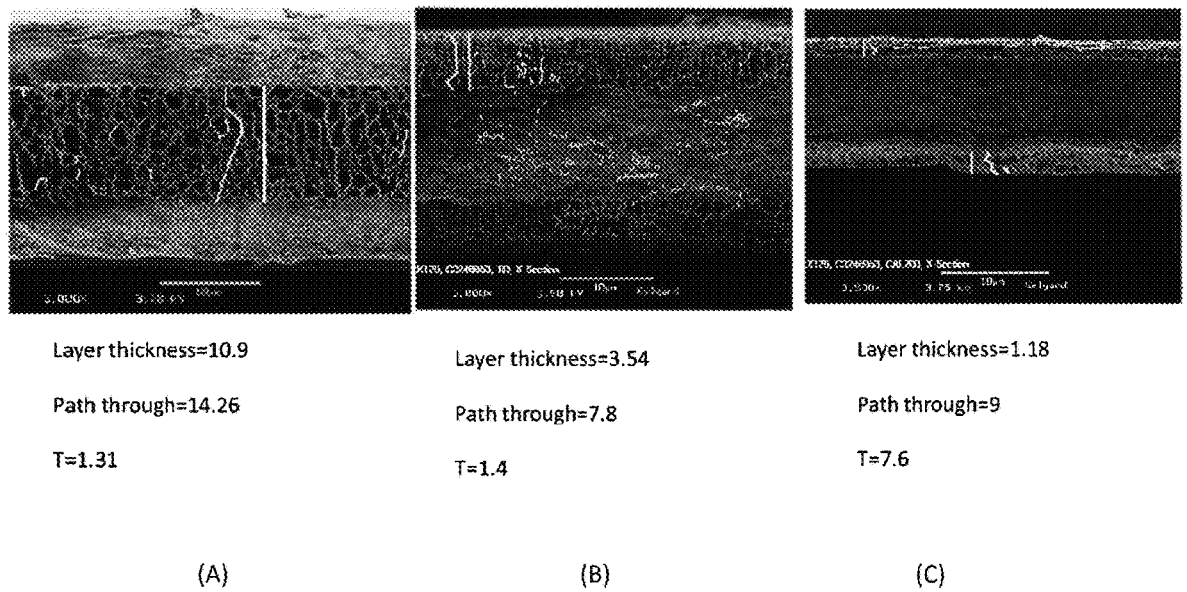
FIG. 28 is a set of three Scanning Electron Micrograph (SEM) images (A), (B), and (C) of the cross section of two TD stretched precursors (A) and (B) at 3,000× magnification and a calendered product (C) at 3,500× magnification and a very schematic representation of thickness and of tortuosity (pore path) shown in at least one PE layer of each membrane.

FIG. 28 is a set of three Scanning Electron Micrograph (SEM) images (A), (B), and (C) of the cross section of two TD stretched precursors (A) and (B) at 3,000× magnification and a calendered product (C) at 3,500× magnification and a very schematic representation of thickness and of tortuosity (pore path) shown in at least one PE layer of each membrane. SEM (A) is a cross section of a biaxially stretched PP/PE/PP trilayer membrane (see FIG. 6). SEM (B) is a cross section of a biaxially stretched PE/PP/PE trilayer membrane (see FIG. 18). SEM (C) is a cross section of a biaxially stretched and calendered PE/PP/PE trilayer membrane (see FIGS. 20 and 21 (B)). If Tortuosity (T) is defined as the Path length through a tortious pore of the membrane (Pltp) divided by the Path length of a straight through pore (Plsp or membrane thickness), then T=1 is a straight through opening, and then typically T is preferably higher than 1 (such as greater than 1, at least 1.5, at least 2.0, at least 2.5, or higher) in a membrane, separator membrane or separator. Typically, a T greater than 1 is desired to help slow or block dendrites, prevent shorts, and perform properly as a lithium battery separator. A membrane T that is too low or too high can cause issues. Hence, too much MD, TD or biaxial stretching could produce some T=1 pores or an average T less than 1.5. This could be an undesirable or too low of a T. And, too little MD, TD or biaxial stretching and/or too much calendering (too high a pressure or compression) could produce some T=10 pores or an average T over 9. This could be an undesirable or too high of a T. A very low T could lead to dendrites or shorts, while a very high T could lead to undesirable high resistance (ER), high Gurley, low conductance, or the like. In accordance with at least selected embodiments, the Tortuosity or T should be over 1, preferably at least 1.5, more preferably at least 2.0, and most preferably at least 2.5, and may be in a range from 1.5 to 9.5, or over 1 and less than 10. There are exceptions, such as but not limited to, the membrane T should be higher than 1 if not using gel polymer that fills the pores or if the pores are not very tiny (nano) pores (0.001 um or less) or if the coating on the membrane does not provide an effective T over 1.

Figure 29:
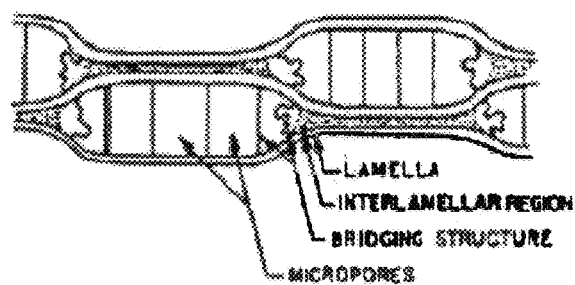
FIG. 29 is a schematic surface diagram showing the spreading apart of lamellae to form micropores bounded by bridging structures or fibrils in a typical MD stretch dry process. The pores are more slit like and oriented in the MD direction (see FIG. 4).

FIG. 29 is a schematic surface diagram showing the spreading apart of lamellae to form micropores in a typical MD stretch dry process polyolefin microporous membrane (microporous film). The pores are more slit like MD oriented rectangles (see FIG. 4). In FIG. 29, discrete elongate openings between adjacent lamellae include a plurality of slit like micropores (a small group of slit like pores) defined by the lamellae and bridging structures or fibrils with the lamellae extending in the transverse direction (TD) and the fibrils extending between lamellae in the machine direction (MD) in the typical MD stretch dry process or Celgard process polyolefin membranes. Similar structures can be evident in certain wet process MD stretched polyolefin membranes.

Figure 17:
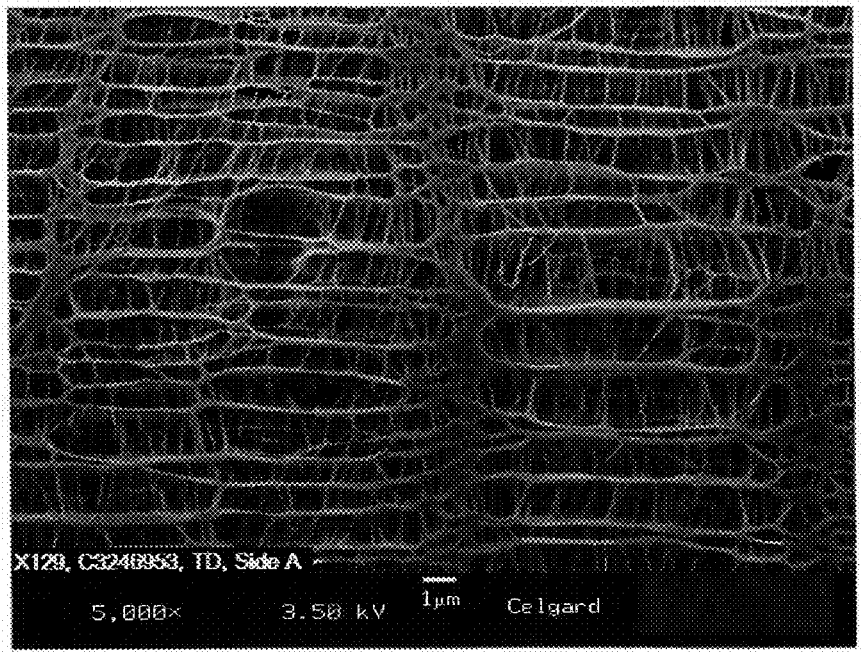
FIG. 17 is a Scanning Electron Micrograph (SEM) image of the surface of Comparative Example 5 PE/PP/PE after MD stretching and TD stretching at a magnification of 5,000×.

The inventive biaxially stretched and calendered (compressed) membrane of FIG. 19 differs from the typical MD only stretched membrane of FIG. 29. One looking at FIGS. 19 and 29 readily see many differences. The membrane of FIG. 19 has been biaxially stretched and then calendered (compressed). Biaxial stretching creates a precursor membrane structure (such as shown in FIG. 17) quite different and unique as compared to the MD only stretched membrane of FIG. 29. The FIG. 17 membrane is an open, fairly regular or ordered net like structure with thin lamellae, TD elongated groups of pores, some broken or missing fibrils, and the like. When the FIG. 17 precursor membrane is calendered, the open net like structure is compressed, the lamella are collapsed on top of each other in the Z direction, at least the surface lamellae and fibrils are flattened, at least some of the adjacent lamellae at or near the surface are stacked or shingled, and less regular, less ordered, more random, densified lamellar skeletal structure with TD elongated large groups of pores (some without fibrils, some with broken fibrils, some with multiple lamellae, or combinations thereof) are formed (see FIGS. 19 and 30 to 37 of the drawings). The FIG. 19 membrane is one inventive example of a compressed PE/PP/PE trilayer membrane. In this example, the respective PE layers compress more (higher % compression) than the PP layer as the PP layer is less compressible (resists compression). In the FIG. 19 example, some of the groups of pores between lamellae have a much longer TD dimension than MD dimension. For example, some are 4, 4.9, 6.2, 8.5, or 9.1 times longer in the TD than wide in the MD (max TD length/max MD length) (see respective items 4, 2, 1, 3, and 5 in FIG. 31). Some of the pores (or pockets or voids) appear very deep in the Z direction (in the membrane thickness dimension) as fibrils are missing or broken and open to lower pores in a Z direction stack of two or more groups of pores.

Figure 31:
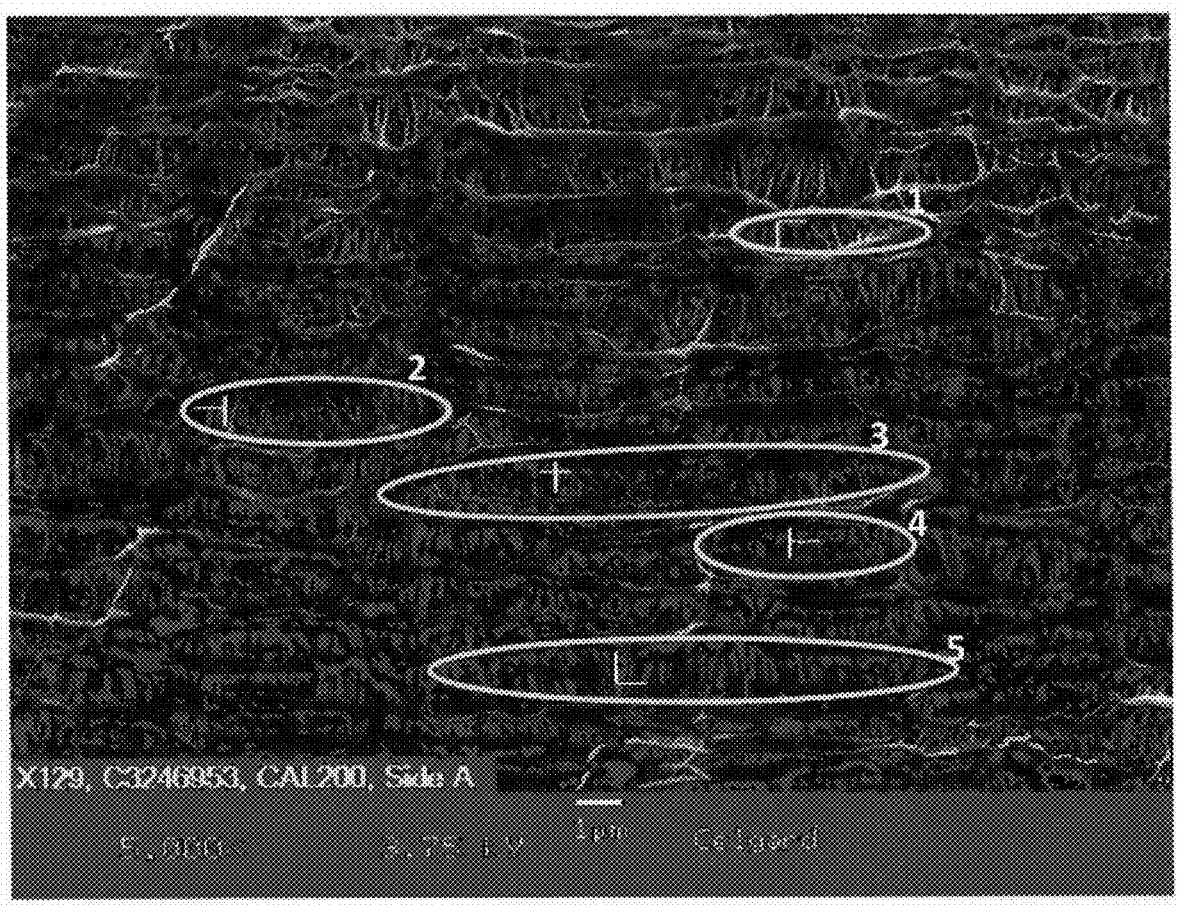
FIG. 31 is modified version of surface SEM of FIG. 19 modified to highlight the pores, pore structure, surface structure, and particular selected portions or pore areas designated 1-5.
Figure 32:
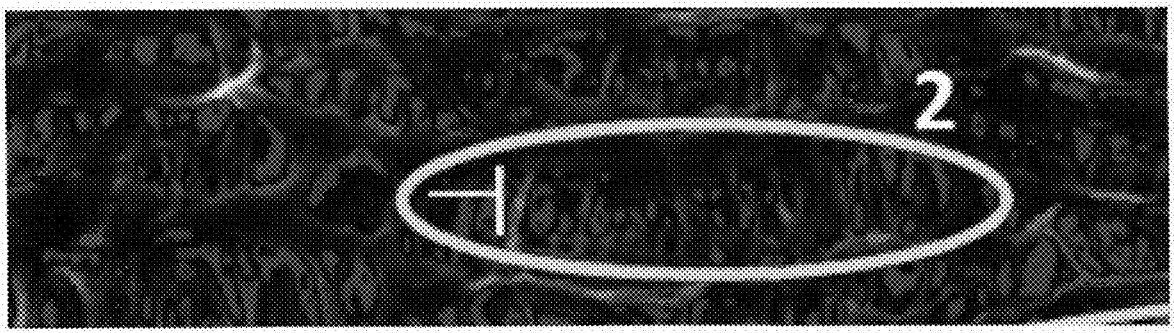
FIGS. 32, 33 and 34 are respective enlarged views of portions of the modified surface SEM of FIG. 31.
Figure 33:
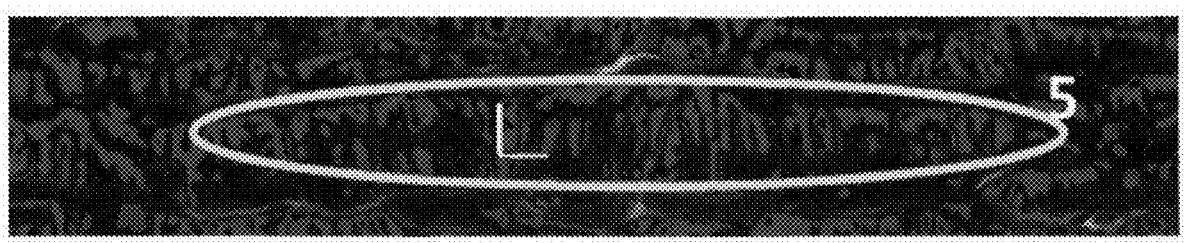
Figure 34:
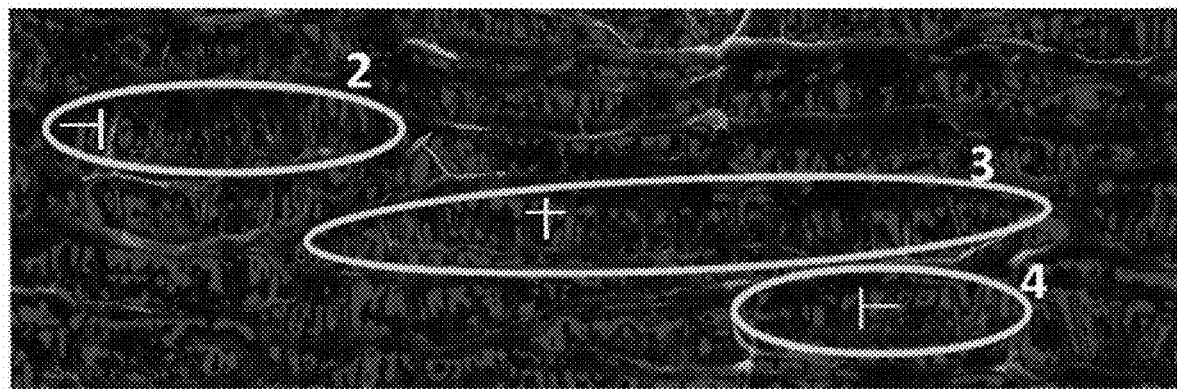
Figure 35:
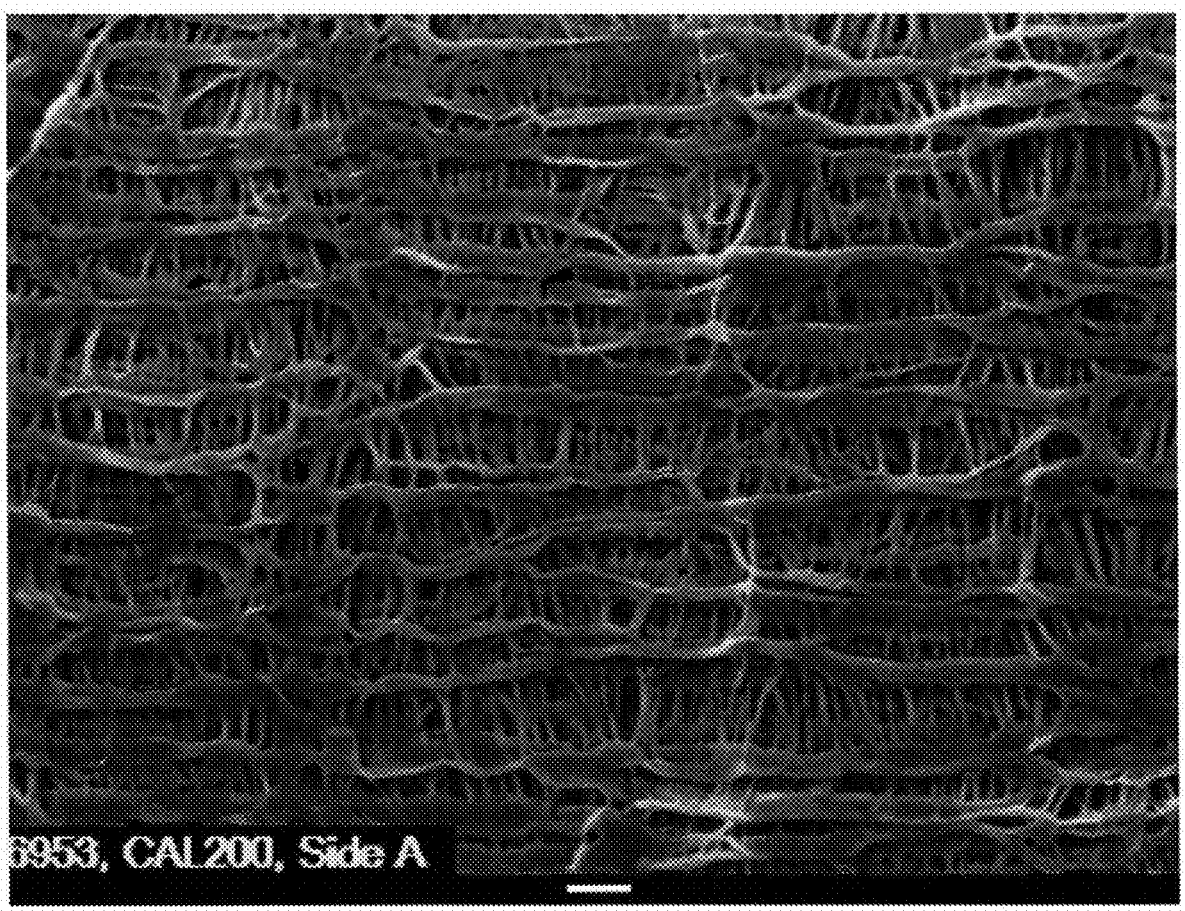
FIGS. 35, 36 and 37 are respective enlarged views of portions of the surface SEM of FIG. 19.
Figure 36:
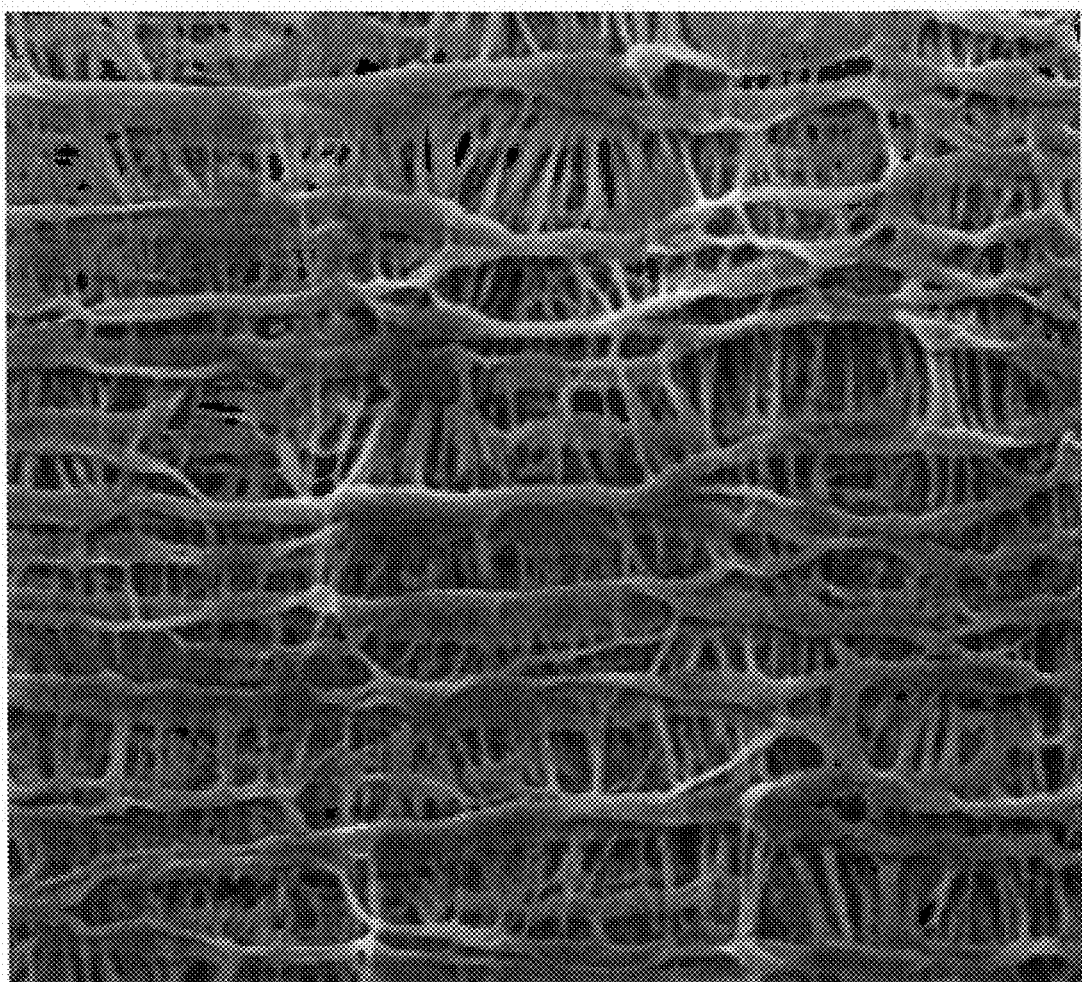
Figure 37:
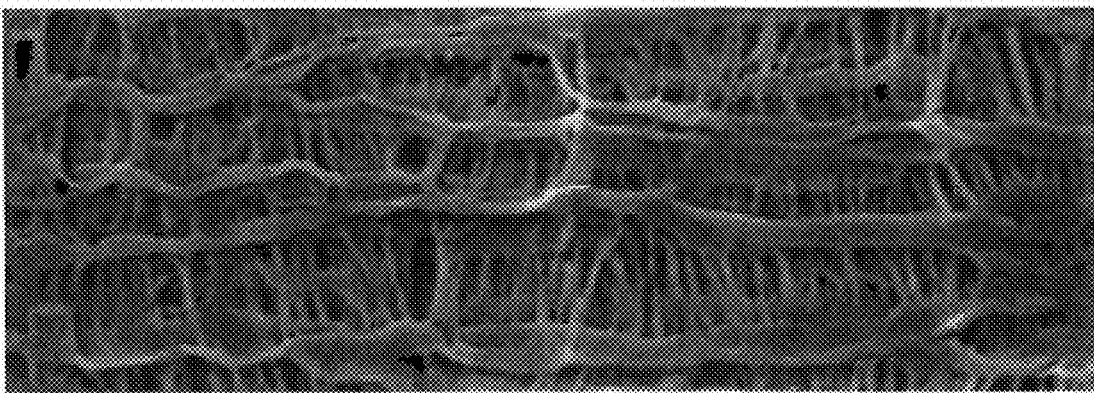

A red coloration is added to FIG. 31 to more clearly show the pores (openings, pockets, or voids) defined between the lamellae and the fibrils or bridging structures. Example or selected groups of pores between adjacent lamellae are circled in yellow and labelled 1-5, respectively.

Also, in items or areas 1-5 of FIG. 31:
1. The average number of "bridging structures" or fibrils may=~18 (18.8) (median is 14);
2. The Average number of "micropores" (pores, openings, voids—shaded red) may=27.5 (median=20);
3. The white lines are 1 um and most micropores are between about 0.5-1.2 um in height (in MD) and between about 0.2-0.5 um in width (in TD); and
4. Lamella are about 0.8-1.0 um thick (in MD).

Such surface pore dimensions (diameter, length, width) are typically measured in the 2 dimensional X-Y plane at the surface. FIG. 19 is the surface SEM of a calendered or compressed PE layer on one side (Side A) of a compressed three layer polyolefin (PE/PP/PE) membrane. It is contemplated that a similar calendered or compressed PE pore structure would be evident on each side of the compressed three layer (PE/PP/PE) membrane, and that a similar calendered or compressed PE pore structure would be evident on each side of a compressed single or multiple layer PE membrane (such as PE, PE/PE, PE/PE/PE, . . . ) or on the PE side of bilayer or multiple layer membranes with an outer PE layer (such as PE/PP, PE/PP/PP, PE/PE/PP, . . . ). The result pore structure may be more ordered if the PE layer is thinner or less TD or biaxially stretched, or it may be less ordered if the PE layer is thicker or more TD or biaxially stretched. The pores (pockets, openings or voids) may be more shallow if the PE layer is thinner or less TD or biaxially stretched, or may be deeper if the PE layer is thicker or more TD or biaxially stretched.

The desired amount of stretch (MD and/or TD) and/or compression is selected to provide the desired thickness, properties, and performance. Too much compression can result in too high of ER or Gurley (too low permeability) while too much stretch can result in too low of ER or Gurley (too high permeability) and may reduce battery life or performance. As described herein dry process polyolefin membranes can be provided that perform the same as or better than wet process membranes and can provide such performance even if they are thinner than the comparative wet process membrane. Thin, strong, performing dry process PO membranes can facilitate the formation of higher energy or higher energy density cells or batteries.

When stretching and compressing PP layers or membranes that are less elastic, less compressible, and typically having smaller pores than similar PE membranes, one would expect a more ordered pore structure than shown in FIG. 19. Nevertheless, PP dry process porous membranes can be provided that perform the same as or better than wet process membranes and can provide such performance even if they are thinner than the comparative wet process membrane. Thin, strong, performing dry process PP membranes can facilitate the formation of higher energy or higher energy density cells or batteries.

Figure 20:
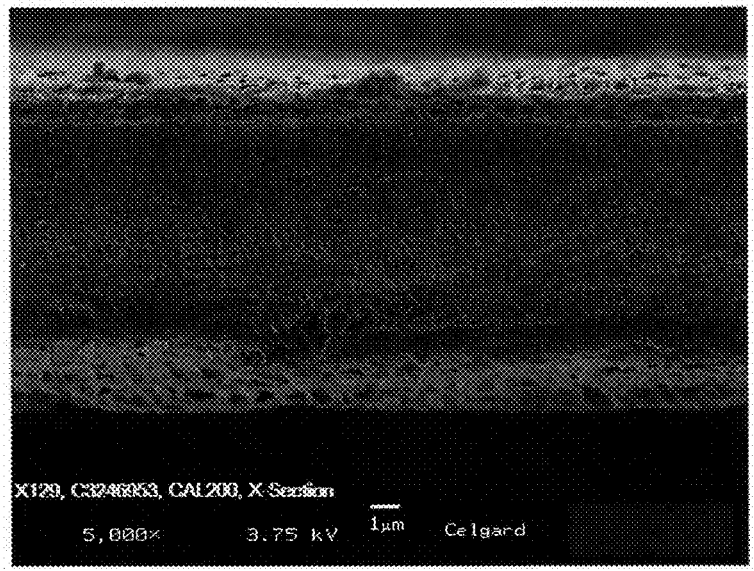
FIG. 20 is a Scanning Electron Micrograph (SEM) image of a cross sectional view of Example 1 at a magnification of 5,000×.
Figure 30:
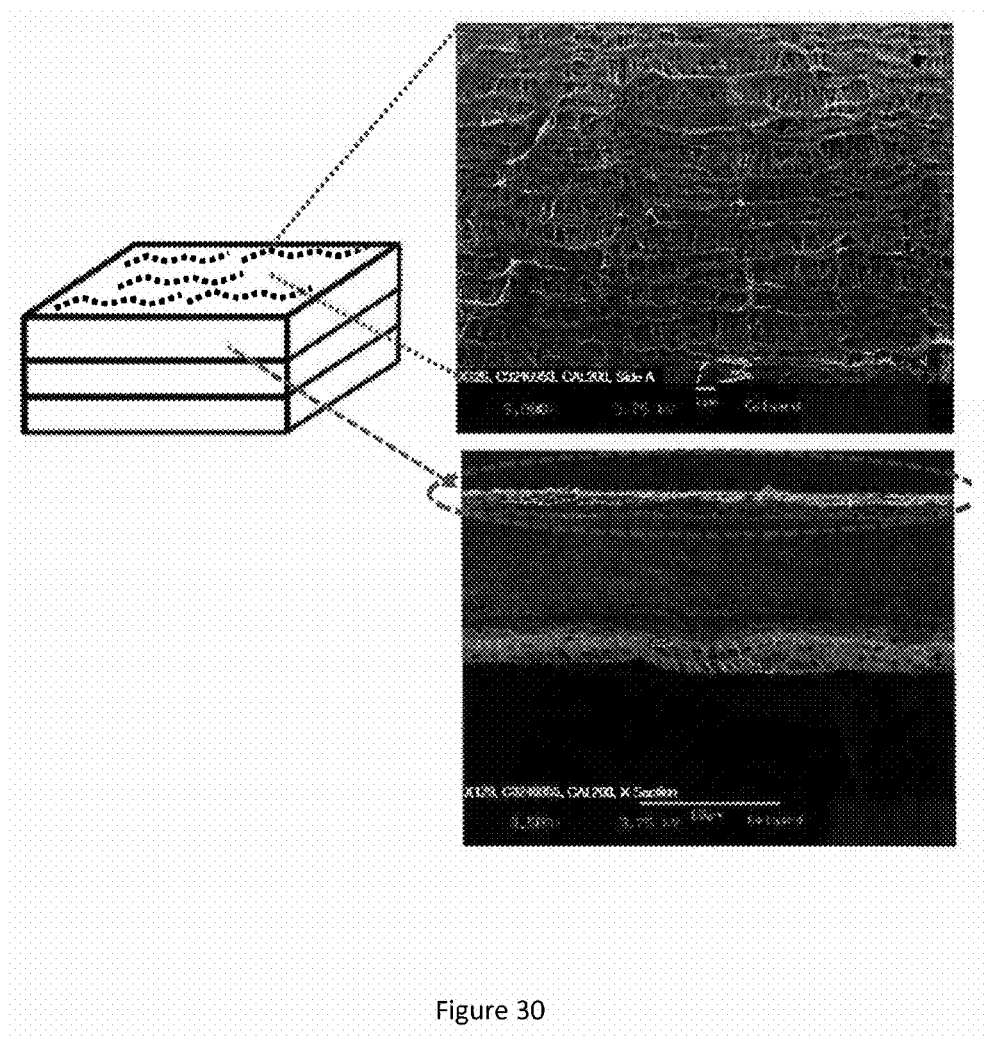
FIG. 30 is a combination of FIGS. 19 and 21 (B) together with a schematic figure of a trilayer membrane or product showing that the Side A surface SEM of FIG. 19 is of the upper surface layer of FIG. 21 (B) and that at least the upper surface of the product has a unique pore structure.

FIG. 30 is a combination of FIGS. 19 and 21 (B) together with a schematic figure of a trilayer membrane or product showing that the Side A surface SEM of FIG. 19 is of the upper surface layer of FIG. 21 (B) and that at least the upper surface of the product has a unique pore structure. FIGS. 19, 20 and 21 (B) are SEMs of a biaxially stretched and calendered PE/PP/PE trilayer membrane. Side A or the surface shown in FIG. 19 is the calendered PE surface. With reference to FIG. 30, the pores of the surface or surface layer (calendered PE layer) tend to be trapezoidal or rectangular with rounded corners with condensed or heavy lamellae across the width in at least the outer or surface PE layer. And they appear less regular or periodic and less open than the pores of FIG. 17.

The micropores formed in the network of lamellas of the outer PE layer of FIGS. 19, 20, 21 (B), and 30 are relatively closed-like structures (see surface view FIG. 19) as the result that the structure of lamellas is pressed or compressed in the thickness direction. The cross sectional view shows some extended micropores in the membrane surface direction (see FIGS. 20, 21 (B), and 30. Also, FIG. 27 Panel 3 (bottom 3 SEMs) may show a similar surface view of micropores formed in the network of lamellas of the outer PP layer that are relatively closed-like structures as the result that the structure of lamellas is pressed or compressed in the thickness direction (with less closed or compressed as PP is less compressible and has smaller pores than PE), and there may be some extended micropores in the membrane surface direction.

Before calendering, the outer PE layer had fish net, regular, light, open elongated oval pores which may be too open, too porous, too light, too weak, too compressible, or combinations thereof. See FIGS. 17 and 18.

The ceramic coating filler or particles may have an average particle size in the range of about 0.001 micron to about 5 microns. In another embodiment, the average particle size of the filler may be in a range of about 0.01 micron to 2 microns. U.S. Pat. No. 6,432,586, which is incorporated herein by reference in its entirety, discloses various ceramic-coated separators. Additionally, U.S. Patent Publication No. 2014/0045033, which is also incorporated herein by reference in its entirety, discloses various ceramic particle-containing polymeric coatings for microporous battery separator membranes.

At least certain embodiments, aspects, or objects of the present application may address the above needs, and/or may provide novel, improved or modified membranes, multilayer membranes, separator membranes, calendered membranes, stretched membranes, stretched and calendered membranes, stretched and calendered dry process membranes, separator membranes, coated membranes, membranes with unique structures, membranes with enhanced performance, membrane separators, battery separators, shutdown separators, and/or batteries or cells including such membranes or separators, and/or methods of making such membranes, separators, cells, and/or batteries, and/or methods of using such membranes, separators, cells, and/or batteries. In accordance with at least selected embodiments, the present application or invention is directed to novel or improved stretched membranes, calendered membranes, stretched and calendered membranes, biaxially stretched membranes, sequentially biaxially stretched membranes, simultaneously biaxially stretched membranes, biaxially stretched and calendered membranes, porous membranes, stretched and calendered dry process membranes, dry process separator membranes, coated dry process membranes, membranes with unique structures, membranes with enhanced performance, single or multilayer membranes, microporous membranes, microporous multilayer membranes, thin calendered membranes, thin and strong calendered membranes, thin, strong and/or high performance calendered membranes, dry process membranes, thin dry process membranes, thin calendered dry process membranes, thin and strong calendered dry process membranes, thin, strong and/or high performance calendered dry process membranes, thin, strong and/or high performance calendered dry process membranes with unique structures and/or characteristics, thin, strong and/or high performance calendered and coated dry process membranes, thin, strong and/or high performance stretched and calendered dry process membranes, thin, strong and/or high performance stretched, calendered and coated dry process membranes, battery separator membranes, battery separators, and/or batteries or cells including such membranes or separators, such stretched, calendered and/or coated membranes or separators, such biaxially stretched and/or calendered membranes or separators, such biaxially stretched and/or coated membranes or separators, or such biaxially stretched, calendered, and/or coated membranes or separators, and/or methods of making such membranes, separators, cells, and/or batteries, and/or methods of using such membranes, separators, cells and/or batteries. In accordance with at least certain embodiments, the present application or invention is directed to novel or improved calendered, single or multilayer membranes, trilayer membranes, inverted trilayer membranes, porous membranes, porous multilayer membranes, trilayer dry process membranes, inverted trilayer dry process membranes, battery separator membranes, battery separators, and/or batteries or cells including such membranes or separators, and/or methods of making such membranes, separators, cells, and/or batteries, and/or methods of using such membranes, separators, cells and/or batteries. In accordance with at least certain selected embodiments, the present application or invention is directed to novel or improved monolayer or multilayer porous membranes or separators. In accordance with at least certain particular selected embodiments, the present application or invention is directed to novel or improved monolayer, multilayer, trilayer, inverted trilayer, porous membranes, porous multilayer membranes, battery separator membranes, and/or battery separators such as a multilayer dry process membrane or separator, a dry process polyolefin membrane or separator, a dry process polyolefin multilayer membrane or separator, and/or a polyethylene/polypropylene/polyethylene microporous membrane or separator which is manufactured using an exemplary inventive process described herein which includes stretching and a subsequent calendering step such as a machine direction stretching followed by transverse direction stretching (with or without machine direction relax) and a subsequent calendering step as a possibly preferred means to reduce the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator. The inventive process may produce 10 μm or less single or multilayer microporous membranes. The inventive process may produce a 10 μm or less multilayer microporous membrane that is easily coated with polymeric-ceramic coatings, has excellent mechanical strength properties due to its inner polypropylene layer, and/or a thermal shutdown function due to the outer polyethylene layers. The ratio of the thickness of the polypropylene and polyethylene layers in such an inventive multilayer microporous membrane can be tailored to select, optimize, and/or balance strength, properties, and/or performance thereof, such as mechanical strength and thermal shutdown properties.

At least certain embodiments, aspects, or objects of the present application may address the industry problems, issues or needs for stronger, thinner, more open, higher C rate, or higher performance separators, and/or may provide novel, improved or modified single or multilayer dry process battery separator membrane, comprising a microporous multilayer separator membrane comprising a trilayer of polyethylene/polypropylene/polyethylene, wherein the membrane has been machine direction stretched followed by a transverse direction stretching, and subsequently calendered using heat and pressure, and/or where said multilayer microporous membrane comprises a polyolefin that may include a polypropylene, a polyethylene, a blend of polyolefins, a mixture of polyolefins, one or more co-polymers of a polyolefin, and combinations thereof, and/or with a thermal shutdown function, and/or where the ratio of the thickness of polyethylene/polypropylene/polyethylene layers ranges from 0.05/0.90/0.05 to 0.25/0.50/0.25, and/or having a thickness of less than 20 μm, preferably less than 15 μm, more preferably less than 12 μm, more preferably less than 10 μm, and/or where the polyethylene/polypropylene/polyethylene microporous membrane has a percent porosity preferably 20% to 55%, more preferably 30% to 50% and most preferably 35% to 50%, and/or where the polyethylene/polypropylene/polyethylene microporous membrane has a TD tensile strength of greater than 500 kgf/cm$^2$; a ceramic coated microporous membrane as described above comprising:

a multilayer microporous membrane having a first and a second surface, a ceramic coating on at least one surface of said multilayer microporous membrane, wherein said ceramic coating comprises ceramic particles and may further include a polymeric binder; a novel, improved or modified process comprising:

extruding a polypropylene to form a nonporous precursor membrane and, extruding a polyethylene to form a nonporous precursor membrane and, stacking the polypropylene and polyethylene in a multilayer polyethylene/polypropylene/polyethylene configuration and, annealing the multilayer polyethylene/polypropylene/polyethylene non-porous multilayer membrane and, machine direction stretching the polyethylene/polypropylene/polyethylene non-porous membrane to form an intermediate uniaxial stretched multilayer microporous membrane and, transverse direction stretching the intermediate uniaxial stretched polyethylene/polypropylene/polyethylene multilayer microporous membrane to form a second intermediate MD and TD stretched polyethylene/polypropylene/polyethylene multilayer microporous membrane and, calendering the second intermediate MD and TD stretched polyethylene/polypropylene/polyethylene multilayer microporous membrane to form a polyethylene/polypropylene/polyethylene multilayer microporous membrane, and/or wherein the calendered MD and TD stretched polyethylene/polypropylene/polyethylene multilayer microporous membrane has a thickness less than 20 μm, preferably, less than 15 μm, more preferably less than 12 μm, and more preferably less than 10 μm; a polyethylene/polypropylene/polyethylene battery separator membrane made according to the above process, where the temperature of calendering is less than 90 deg C.; a novel or improved microporous multilayer battery separator membrane, separators, batteries including such separators, methods of making such membranes, separators, and/or batteries, and/or methods of using such membranes, separators and/or batteries; a multilayer dry process polyethylene/polypropylene/polyethylene microporous separator which is manufactured using the inventive process which includes machine direction stretching followed by transverse direction stretching and a subsequent calendering step as a means to reduce thickness of a multilayer microporous membrane, reduce the percent porosity of a multilayer microporous membrane in a controlled manner and improve transverse direction tensile strength; a thin multilayer microporous membrane that is easily coated with polymeric-ceramic coatings, has excellent mechanical strength properties due to its inner polypropylene layer and a thermal shutdown function due to the outer polyethylene layers; the ratio of the thickness of the polypropylene and polyethylene layers in the inventive multilayer microporous membrane can be tailored to balance mechanical strength and thermal shutdown properties; and/or combinations thereof.

At least certain embodiments, aspects, or objects of the present application or invention may provide novel or improved microporous single or multilayer battery separator membranes, separators, batteries including such membranes or separators, methods of making such membranes, separators, and/or batteries, and/or methods of using such membranes, separators and/or batteries. In accordance with at least certain embodiments, a multilayer dry process polyethylene/polypropylene/polyethylene microporous separator which is manufactured using the inventive process which includes machine direction stretching followed by transverse direction stretching and a subsequent calendering step as a means to reduce the thickness of the multilayer microporous membrane, to reduce the percent porosity of the multilayer microporous membrane in a controlled manner and/or to improve transverse direction tensile strength. In a very particular embodiment, the inventive process produces a thin multilayer microporous membrane that is easily coated with polymeric-ceramic coatings, has excellent mechanical strength properties due to its polypropylene layer or layers and a thermal shutdown function due to its polyethylene layer or layers. The ratio of the thickness of the polypropylene and polyethylene layers in the inventive multilayer microporous membrane can be tailored to balance mechanical strength and thermal shutdown properties.

At least certain embodiments, aspects, or objects of the present application or invention may address the needs for and/or may provide a novel or improved multilayer shutdown microporous membrane that has a thickness less than 10 μm for use as a battery separator and/or as a microporous substrate for polymeric-ceramic based coatings to form a coated battery separator, a multilayer shutdown microporous membrane with a thickness less than 10 μm which may be easily coated with a polymeric-ceramic based coating where the coating has excellent adhesion to the membrane and excellent adhesion to an electrode, a multilayer shutdown microporous membrane with a thickness less than 10 μm which may be coated with a polymeric-ceramic based coating where the coating thickness may be less than 7 μm, a need for a multilayer shutdown microporous membrane with a thickness less than 10 μm which has excellent machine direction (MD) and transverse direction (TD) tensile strength and that can be easily coated with a polymeric-ceramic coating, and/or combinations thereof.

The present application is directed to novel or improved microporous single or multilayer battery separator membranes, membrane separators, or separators, and/or batteries or cells including such membranes or separators, and/or methods of making such membranes, separators, cells, and/or batteries, and/or methods of using such membranes, separators, cells, and/or batteries. In accordance with at least certain embodiments, the present invention is directed to a single layer or multilayer dry process polyolefin microporous membrane, membrane separator or separator (such as PP, PE, PP/PP, PE/PE, PP/PE, PP/PE/PP, PE/PP/PE, PE/PP/PP, PP/PE/PE, PE/PP/PP/PE, PP/PE/PE/PP, PP/PP/PP, PE/PE/PE, PP-PE, PP-PE/PP, PP-PE/PE, PP-PE/PP-PE, PP-PE/PE/PP-PE, or the like) which is manufactured using the inventive process which includes machine direction stretching followed by transverse direction stretching (with or without MD relax, preferably with MD relax, such as with 10-90% MD relax, 20-80% MD relax, 30-70% MD relax, or 40-60% MD relax, or with at least 20% MD relax) and a subsequent calendering step as a means to reduce the thickness of the membrane, reduce the percent porosity of the membrane in a controlled manner and/or to improve transverse direction tensile strength. The inventive process may produce a 10 μm or less thick single layer or multilayer microporous membrane, separator membrane, base film, or separator that is easily coated with polymeric-ceramic coatings, has excellent mechanical strength properties due to its polypropylene layer(s) and/or a thermal shutdown function due to its polyethylene layer(s). The ratio of the thickness of the polypropylene and polyethylene layers in the inventive multilayer microporous membrane can be tailored to balance mechanical strength and thermal shutdown properties.

TEST METHODS

Thickness

Thickness is measured using the Emveco Microgage 210-A precision micrometer thickness tester according to test procedure ASTM D374. Thickness values are reported in units of micrometers, μm.

Gurley

Gurley is defined as the Japanese Industrial Standard (JIS Gurley) JIS P8117 and is an air permeability test measured using the OHKEN permeability tester. JIS Gurley is the time in seconds required for 100 cc of air to pass through one square inch of film at constant pressure of 4.8 inches of water.

Puncture Strength

Test samples are pre-conditioned to 73.4 deg C. and a relative humidity of 50% for a minimum of 20 minutes. An Instron Model 4442 is used to measure puncture strength of test sample. Thirty measurements are made across the diagonal direction of a 1¼"×40" continuous sample specimen and averaged. The puncturing needle has a 0.5 mm radius. The rate of descent of the puncturing needle is 25 mm/min. The film is held tight in a clamping device which utilizes an O-ring to securely hold the test sample in place. The diameter of this secured area is 25 mm. The displacement (in mm) of the film that was pierced by the puncturing needle is recorded against the resistance force (in gram force) developed by the tested film. The maximum resistance force is the puncture strength in units of gram force (gf). A load-versus-displacement plot is produced by this test method.

Porosity

The porosity of a microporous film sample is measured using ASTM method D-2873 and is defined as the percent void spaces in a microporous membrane.

TD and MD Tensile Strength

The tensile strength along the Machine direction (MD) and Transverse direction (TD) directions is measured using Instron Model 4201 according to ASTM D-882 method.

Electrical Resistance (ER)

Electrical Resistance is defined as the Resistance value in ohm-cm$^2$ of a separator filled with electrolyte. The separator resistance is characterized by cutting small pieces of separators from the finished material and then placing them between two blocking electrodes. The separators are saturated with the battery electrolyte with 1.0 M $LiPF_6$ salt in EC/EMC solvent of 3:7 ratio by volume. The Resistance, R, in Ohms (Ω), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ (Ω), of the separator saturated with electrolyte is then calculated by the formula $R_s=p_s l/A$ where $p_s$ is the ionic resistivity of the separator in Ω-cm, A is the electrode area in cm² and l is the thickness of the separator in cm. The ratio $p_s/A$=is the slope calculated for the variation of the separator resistance (ΔR) with multiple layers (Δδ) which is given by slope=$p_s/A=\Delta R/\Delta \delta$.

MD and TD % Elongation

The MD % elongation or the % MD elongation at break is the percentage of extension in the machine direction of a test sample measured at the maximum tensile strength needed to break a sample. The TD % elongation or the % TD elongation at break is the percentage of extension in the transverse direction of a test sample measured at the maximum tensile strength needed to break a sample.

Roughness:

The Nanovea ST400 3D Profilometer utilizing a 12 μm (in diameter) needle to measure the surface characteristics of membranes. Using a non-contact optical line sensor a scan is made and quantified using analysis software.

COF:

Rhesca FPR-2000 Friction Player was used to determine the surface friction coefficient of the membrane.

Hot Tip Hole Propagation Test:

In the Hot tip hole propagation test a hot tip probe at a temperature of 450° C. with a tip diameter of 0.5 mm is touched to the surface of the separator membrane. The hot tip probe approaches the membrane at a speed of 10 mm/minute and is allowed to contact the surface of the separator membrane for a period of 10 seconds. Results are captured using a digital image taken with an optical microscope showing both the shape of the hole formed as a result of the response of the separator membrane to 450° C. hot tip probe and the diameter of the hole in the separator after hot tip probe is removed. Minimal propagation of the hole in the separator membrane from contact with the hot tip probe simulates the desired response of the separator membrane to a localized hot spot which may occur during an internal short circuit in Li-ion cells.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

We claim:

1. A process comprising:

extruding a polypropylene to form a polypropylene nonporous precursor membrane and, extruding a polyethylene to form a polyethylene nonporous precursor membrane and, stacking the polypropylene nonporous precursor membrane and polyethylene nonporous precursor membrane in a multilayer polyethylene/polypropylene/polyethylene configuration to form a multilayer polyethylene/polypropylene/polyethylene non-porous membrane and, annealing the multilayer polyethylene/polypropylene/polyethylene non-porous membrane and, machine direction stretching the multilayer polyethylene/polypropylene/polyethylene non-porous membrane to form an intermediate machine direction (MD) stretched polyethylene/polypropylene/polyethylene multilayer microporous membrane and, transverse direction stretching the intermediate MD stretched polyethylene/polypropylene/polyethylene multilayer microporous membrane to form a second intermediate MD and TD stretched polyethylene/polypropylene/polyethylene multilayer microporous membrane and, calendering the second intermediate MD and TD stretched polyethylene/polypropylene/polyethylene multilayer microporous membrane to form a calendered MD and TD stretched polyethylene/polypropylene/polyethylene multilayer microporous membrane, recovering the calendered MD and TD stretched polyethylene/polypropylene/polyethylene multilayer microporous membrane which includes a portion including groups of pores between adjacent lamellae with the lamellae oriented substantially along a transverse direction (TD) and fibrils or bridging structures between the adjacent lamellae oriented substantially along a machine direction (MD) and an outer surface of at least some of the lamellae being substantially planar and groups of pores with a TD/MD length ratio of at least 4, groups of pores with a TD/MD length ratio of at least 6, groups of pores with a TD/MD length ratio of at least 8, groups of pores with a TD/MD length ratio of at least 9, groups of pores with at least 10 fibrils, groups of pores with at least 14 fibrils, groups of pores with at least 18 fibrils, or groups of pores with at least 20 fibrils.

2. The process according to claim 1, wherein the calendered MD and TD stretched polyethylene/polypropylene/polyethylene multilayer microporous membrane has a thickness less than 20 μm.

3. The process according to claim 1 wherein a ceramic coating is incorporated into the calendering process.

4. A polyethylene/polypropylene/polyethylene battery separator membrane made according to the process described in claim 1, where the temperature of calendering is less than 90 deg C.

* * * * *